Sept. 15, 1964　　　L. M. SCHMIDT　　　3,149,309
INFORMATION STORAGE AND SEARCH SYSTEM
Filed Dec. 10, 1959　　　13 Sheets-Sheet 1
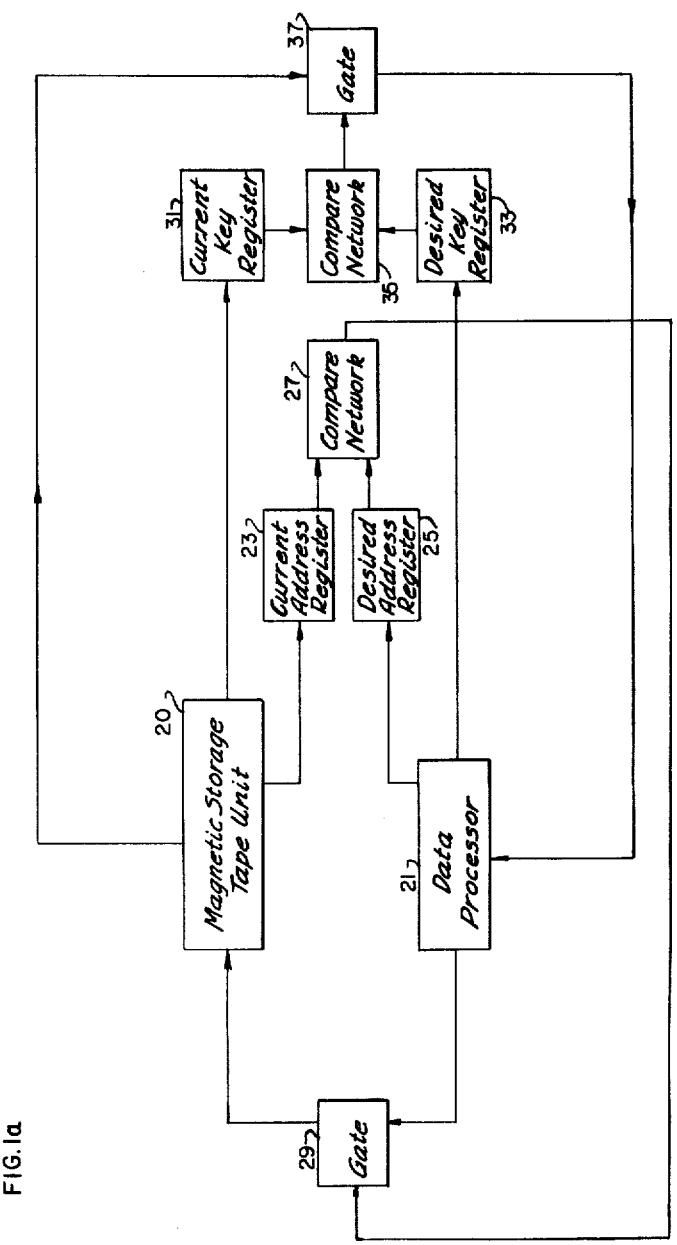
FIG.1a
*INVENTOR.*
LOTHAR M. SCHMIDT
BY 
ATTORNEY Sept. 15, 1964     L. M. SCHMIDT     3,149,309

INFORMATION STORAGE AND SEARCH SYSTEM

Filed Dec. 10, 1959     13 Sheets-Sheet 2

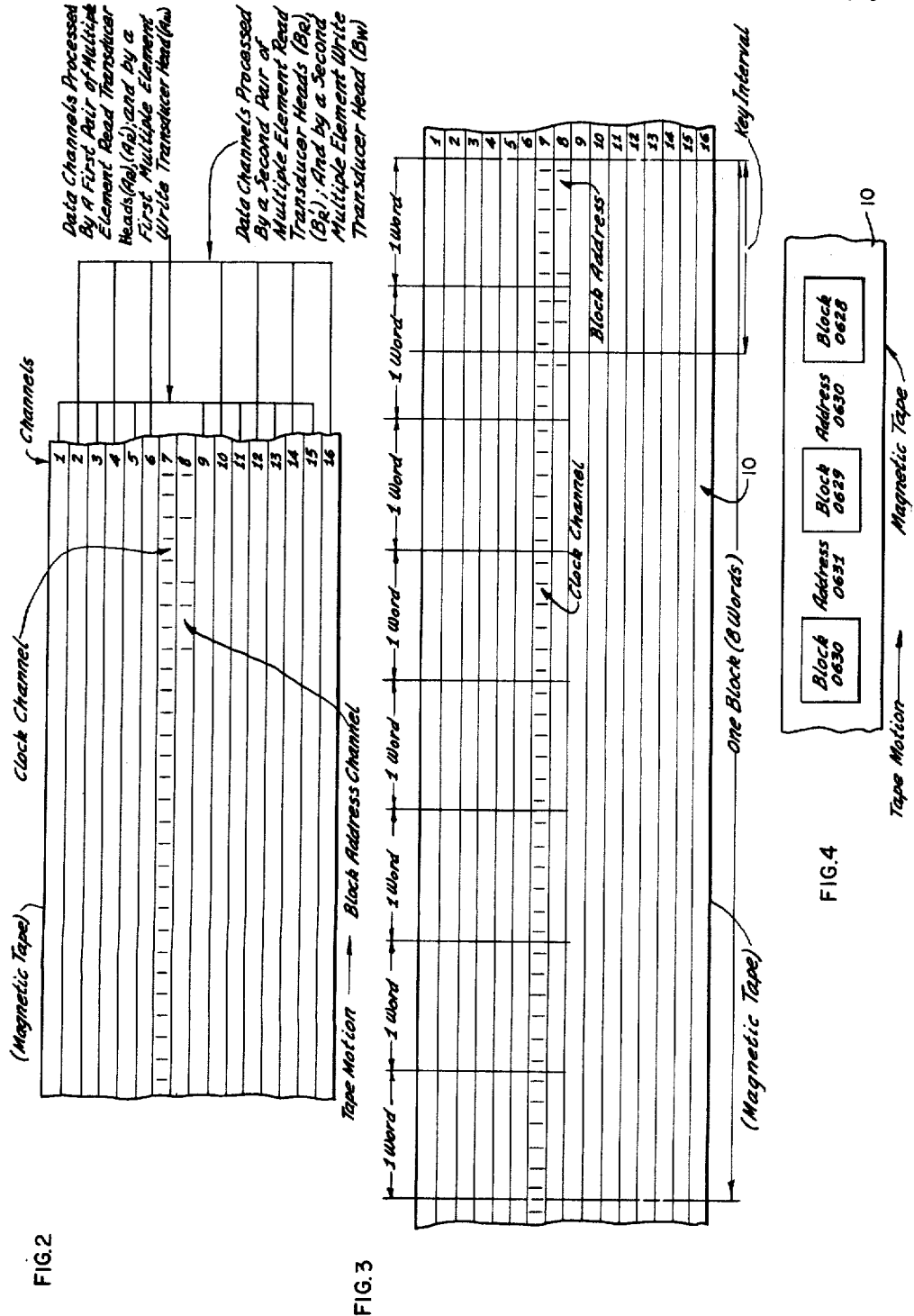

Sept. 15, 1964　　　L. M. SCHMIDT　　　3,149,309
INFORMATION STORAGE AND SEARCH SYSTEM
Filed Dec. 10, 1959　　　13 Sheets-Sheet 5

Sept. 15, 1964     L. M. SCHMIDT     3,149,309
INFORMATION STORAGE AND SEARCH SYSTEM
Filed Dec. 10, 1959     13 Sheets-Sheet 8
FIG.9     *Block Address Read Amplifier (R)*
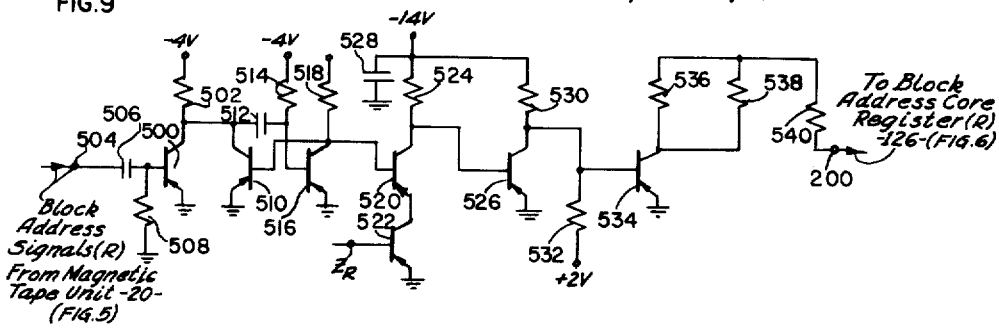
FIG.10     *Block Address Sense Amplifier (R) -128-*
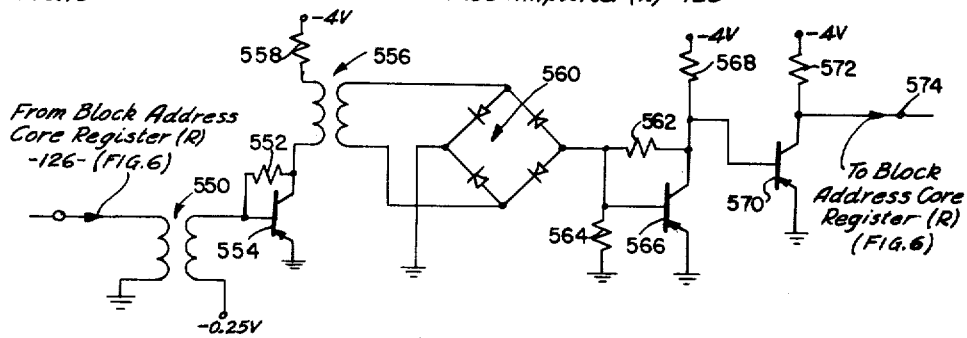
FIG.11     *Load Circuit -130-*
*(For Block Address Core Register (R) -126-*
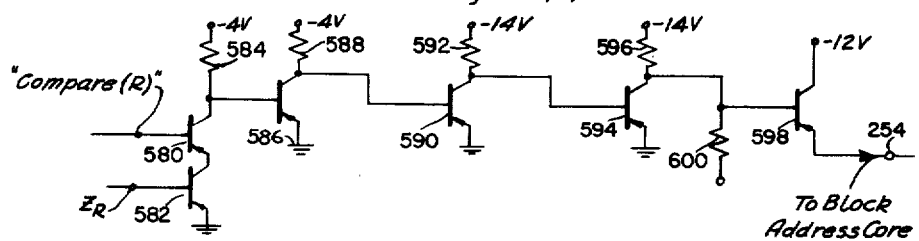
FIG.12     *Unload Circuit -132-*
*(For Block Address Core Register (R)-126-*
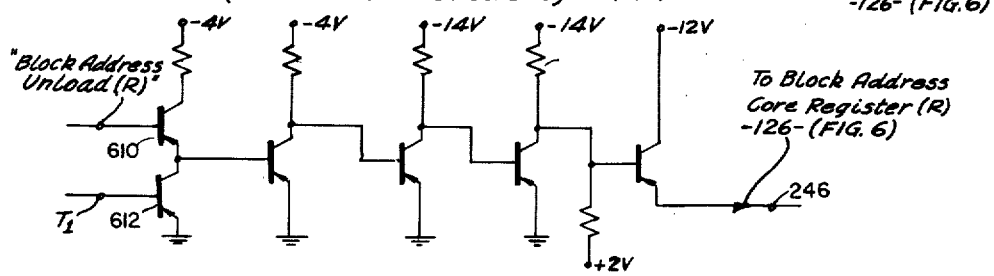

Sept. 15, 1964  L. M. SCHMIDT  3,149,309
INFORMATION STORAGE AND SEARCH SYSTEM
Filed Dec. 10, 1959  13 Sheets-Sheet 12

United States Patent Office 3,149,309
Patented Sept. 15, 1964

3,149,309
INFORMATION STORAGE AND SEARCH SYSTEM
Lothar M. Schmidt, Glendale, Calif., assignor to General Precision, Inc., a corporation of Delaware
Filed Dec. 10, 1959, Ser. No. 858,788
13 Claims. (Cl. 340—172.5)

The present invention relates to magnetic memory or storage systems and methods, and it relates more particularly to an improved system and method by which data is recorded and stored on a movable medium such as a magnetic tape or drum.

The storage system of the present invention is intended for use with known types of digital computers and data processors. When so used, the system of the invention serves as a memory for such computers and data processors. A memory system of the general type with which the present invention is concerned is disclosed, for example, in copending application Serial No. 737,862, filed May 26, 1958, in the name of the present inventor.

In an embodiment of the invention which will be described, data is stored in the memory system in the form of "blocks." The blocks of data in the embodiment to be described are recorded on a magnetic memory tape. In accordance with the teaching of the copending application, the position of each block on the tape is identified by a fixed block address corresponding in each instance to the particular position of its block of data. These fixed addresses may, for example, be arranged in sequential manner on the tape, and each address refers to a corresponding space on the tape in which a block of data is recorded, or may be recorded.

By the use of the fixed block addresses described in the preceding paragraph, any particular block of data recorded on the tape may be located by the system of the copending case and read out of the system. However, the fixed address of the block in question must be known by that system before such a read-out can be realized. When the desired fixed block address is known, that address is inserted in suitable search mechanism and associated logic circuitry in the system of the copending case, and the system is controlled by the mechanism and circuitry to cause the block of data corresponding to that block to be read out of the system.

In like manner, and as described in the copending case, blocks of new data, or up-dated data, may be recorded on the tape at fixed indexed locations, by determining a suitable fixed block address on the tape at which a particular block is to be recorded, and then by initiating suitable control mechanism and circuitry which enables the block to be recorded at a location on the tape indexed by the chosen fixed address.

A suitable system for storing data blocks and for carrying out the above operations is described, as mentioned, in the copending application Serial No. 737,862. In the system disclosed in the copending application, any block of data recorded on the tape may be rapidly selected by reference to its block address, and the selected block may be introduced to a data processor or computer which is coupled to the memory system. The block of data may then be utilized in the data processor, for example, either to derive information concerning a particular item, or to up-date the data in the block. The data processor, after it has so utilized the block of data, returns it to the memory system, and suitable mechanism and circuitry are controlled to cause the block to be recorded on the tape in the memory system at its original position, as indicated by the fixed block address corresponding to that position.

The improved memory system and method of the present invention is similar in some respects to the storage system described briefly in the preceding paragraphs and in detail in the copending application 737,862. However, the storage system of the present invention incorporates certain features which render it even more convenient to operate and use and which enables even more rapid access to be achieved to the blocks of data stored in the memory system.

In one of its aspects, the improved memory system and method of the invention utilizes, in addition to the fixed block addresses discussed above, a key which refers to the actual data block itself, rather than to a particular location on the storage medium. In accordance with this key concept, each data block location on the storage medium is identified by a different fixed block address; and each block of data itself is identified by a key which identifies the block rather than a location on the storage medium.

The fixed block address, for example, may be in the form of digital numbers recorded in a binary code at fixed intervals on the storage medium and in a selected channel of the medium. Each key may also be represented by a multidigital number in binary code. The key, however, occupies a predetermined position in the data block itself, and it is read from and recorded on the storage medium in the same manner as other data in the block is read or recorded. The key, and the data, in the individual data blocks, likewise may be stored in the memory system in accordance with a binary code.

The fixed block address and key concept of the present invention provides a high degree of flexibility in the storage system of the invention and it simplifies the programming operations. The concept, for example, permits each of the different blocks of data to be stored at any available block address in the storage medium, without the necessity of programming each block to a corresponding block address. Searches for any particular block of data in the storage medium may then be made on the basis of its key which directly relates to the data, rather than on the basis of a block address which has been arbitrarily assigned to the block of data by the programmer.

When the desired blocks of information, selected from the storage medium in the manner described in the preceding paragraph, have been fed to the associated computer or data processor and processed thereby, the fixed block addresses of the selected block serves as a convenient means for permitting the data processor to return to the different blocks to their original locations in the storage medium. The system, moreover, enables the data processor by a simple sorting operation of the block addresses of the different blocks processed by it, to cause the blocks to be returned in sequence to the storage medium with a minimum of required time and in a single pass of the storage medium.

Another feature of the memory system of the present invention is the provision for the simultaneous search for several blocks of data on the storage medium. Then, as each desired block is found, it may be quickly read out of the storage system and into the data processor. This latter feature provides for a rapid accessibility of data in the memory system, since it enables, for example, several discrete blocks of wanted information to be obtained in a single revolution of the storage drum or tape.

In the drawings:

FIGURES 1A and 1B are general block diagrams of a system capable of carrying out the concepts of the present invention;

FIGURE 2 is a fragmentary schematic diagram of a magnetic storage tape to be used in the system of FIGURE 1; this diagram illustrating the disposition of certain data, address and clock channels on the tape;

FIGURE 3 is a diagram, like FIGURE 2 but on an enlarged scale, the latter diagram showing more particularly the disposition of the block address and key recordings on the tape;

FIGURE 4 is a further schematic diagram of the magnetic tape and shows how different blocks of data and corresponding block addresses may be recorded on the tape;

FIGURE 9 is a transistorized circuit diagram of an amplifier for use in the system of FIGURE 5;

FIGURE 10 is an amplifier of the transistor type for use in the system of FIGURE 5 and which includes a bridge-type rectifier for reasons to be described;

FIGURE 11 is a circuit for controlling the core register of FIGURE 6 to condition that register to a loading mode;

FIGURE 12 is a circuit for controlling the core register of FIGURE 6 to condition that register to an unloading mode;

Figure 5:
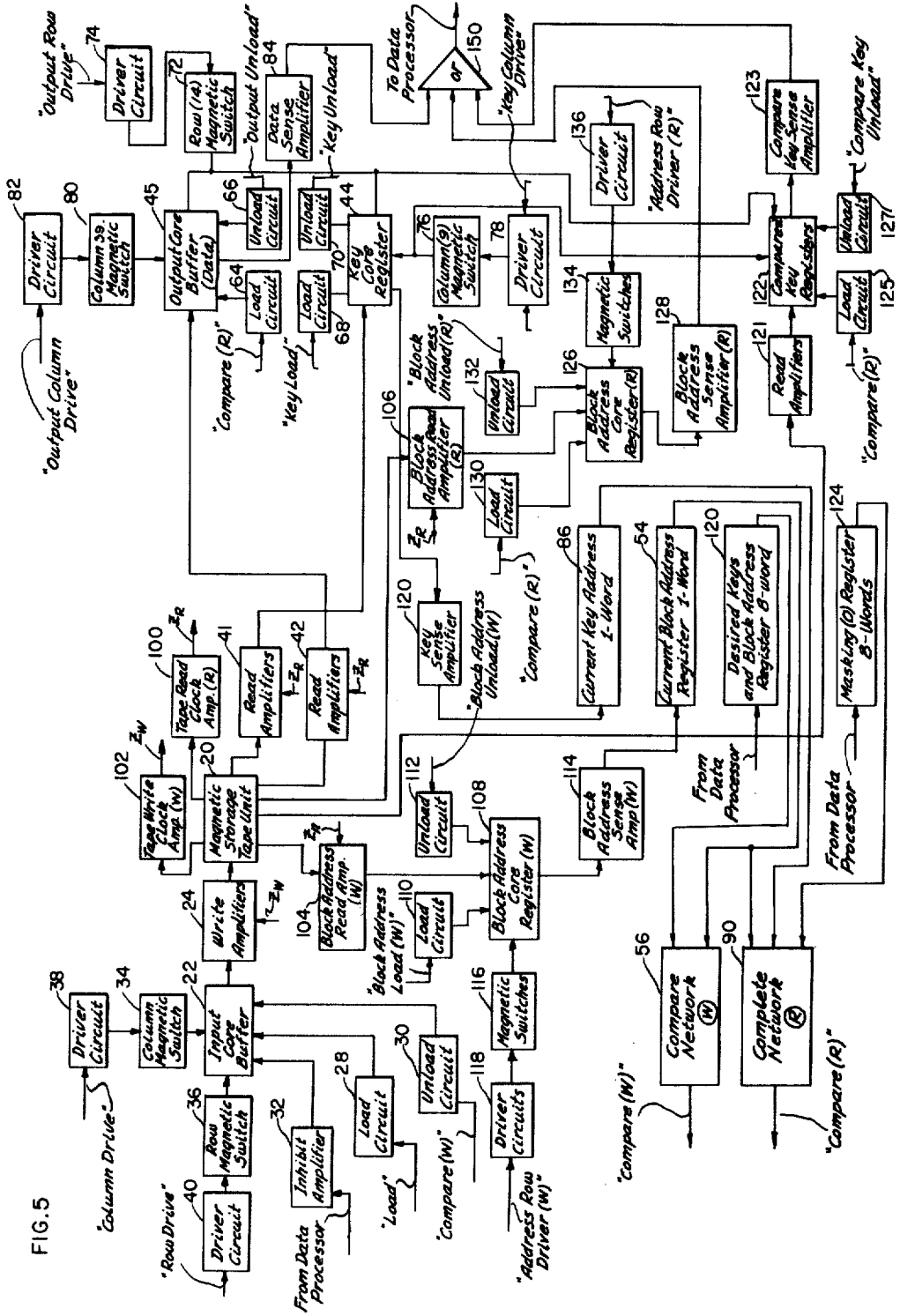
FIGURE 5 is a more particularized block diagram of the system of FIGURE 1, the latter showing in more detail the component required to carry out the concepts of the present invention.
Figure 17:
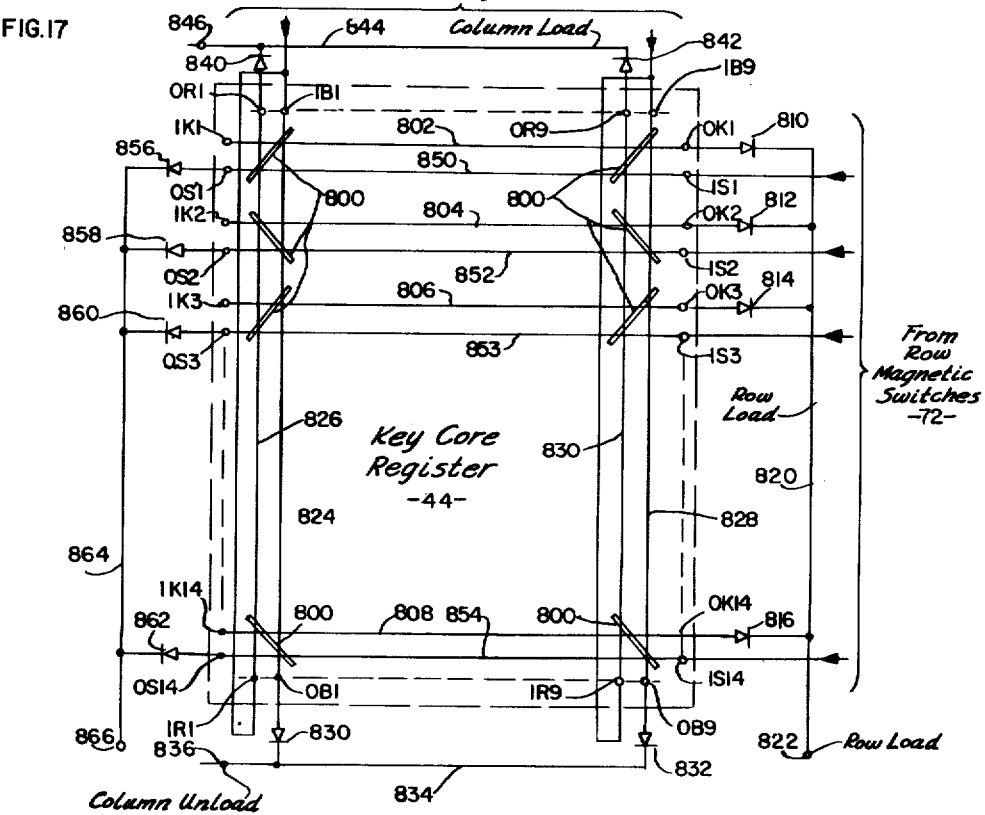
FIGURE 17 is a circuit diagram of a key core register which is included in the system of FIGURE 5.
Figure 20:
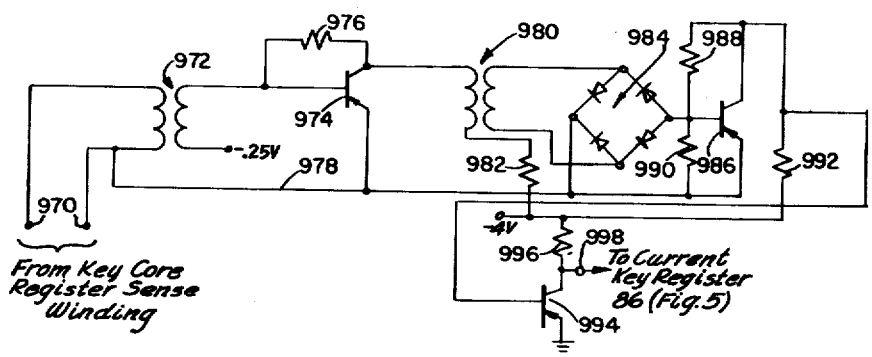
Figure 21:
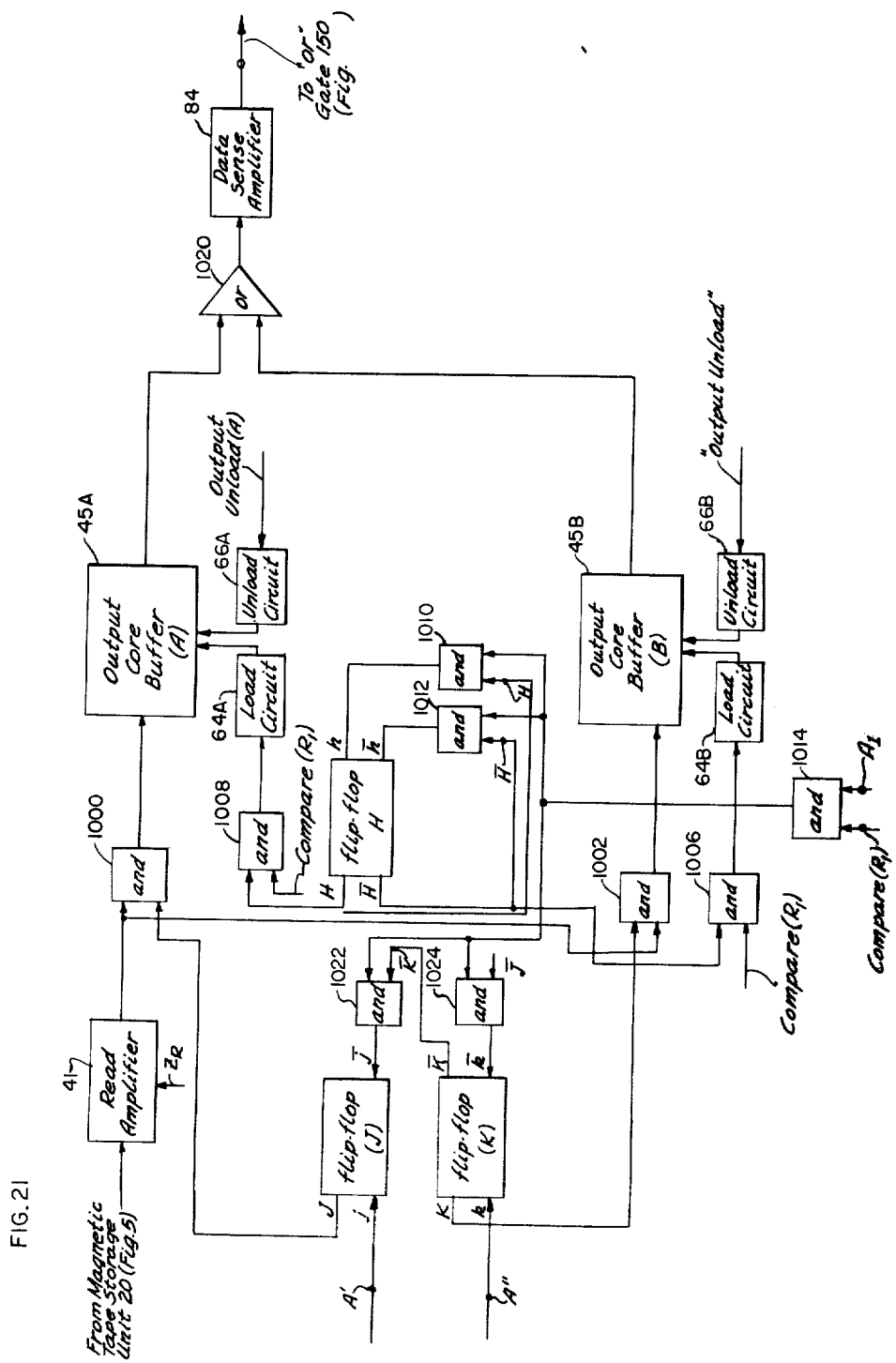

FIGURE 20 is an amplifier circuit for the key signals derived from the key core register of FIGURE 17; and FIGURE 21 is a particularized block diagram of a portion of the system of FIGURE 5 showing a modification of the invention which includes a plurality of output core buffers to enable a corresponding plurality of blocks of data to be selected from the magnetic tape and held until required by an associated data processor or computer.

A generalized example of a data processing system which incorporates the memory system of the invention, is illustrated in block form in FIGURE 1A. In the illustrated system, a plurality of blocks of data are stored in an appropriate memory, such as a magnetic storage tape unit 20. As noted above, respective ones of the blocks of data are recorded on the magnetic storage tape in the unit 20 at different locations, and these locations are identified by corresponding block addresses which are also recorded on the magnetic storage tape.

The system of FIGURE 1A includes a data processor 21. The data processor may include, for example, any suitable general purpose or special purpose computer. The magnetic unit 20 is coupled to a current block address register 23, and this register stores the block addresses corresponding to successive locations on the magnetic storage tape as the tape is read in the unit 20. The data processor is connected to a desired block address register 25, in which it inserts an address on the magnetic storage tape at which a particular block of data is to be stored.

The current address register 23 and the desired address register 25 are both connected to a compare network 27. The compare network produces an output signal when the current address in the register 23 matches the desired address in the register 25. This output signal is introduced to a gate 29, the gate being interposed between the data processor and the magnetic storage tape unit 20. The gate is opened by the output signal from the compare network 27 at the proper time to permit a particular block of data from the data processor 21 to be recorded at the desired address location on the magnetic storage tape.

The system of FIGURE 1A includes a current key register 31 which is connected to the magnetic storage tape unit 20, and it includes a desired key register 33 which is connected to the data processor. The current key register 31 receives the key position of each block of data recorded on the magnetic storage tape, as the blocks of data are successively read in the unit 20. The desired key register 33, on the other hand, receives the key information pertaining to a particular block of data required by the data processor 21.

The registers 31 and 33 are connected to a compare network 35, and the compare network introduces an output signal to a gate 37 when the current key in the register 31 matches the desired key in the register 33. The gate 37 is interposed between the unit 20 and the data processor 21, and it is opened by the output signal from the compare network 35 at the proper time to permit the required block of data, as identified and selected by its own particular key, to be read into the data processor 21.

The system of FIGURE 1A functions in such a manner that when a particular block of data on the magnetic storage tape is required by the data processor, the block is selected by the data processor on the basis of its own identifying key. When the selection is made, the block address of the selected block is also read into the data processor. Then, when it is desired to return the block, either in the same or in altered form, to the magnetic storage tape unit 20, its block address is then introduced by the data processor into the desired block address register 25. Then, when the proper block address location on the tape is reached, the gate 29 is opened to enable the block of data to be read into the tape unit 20.

Figure 1B:
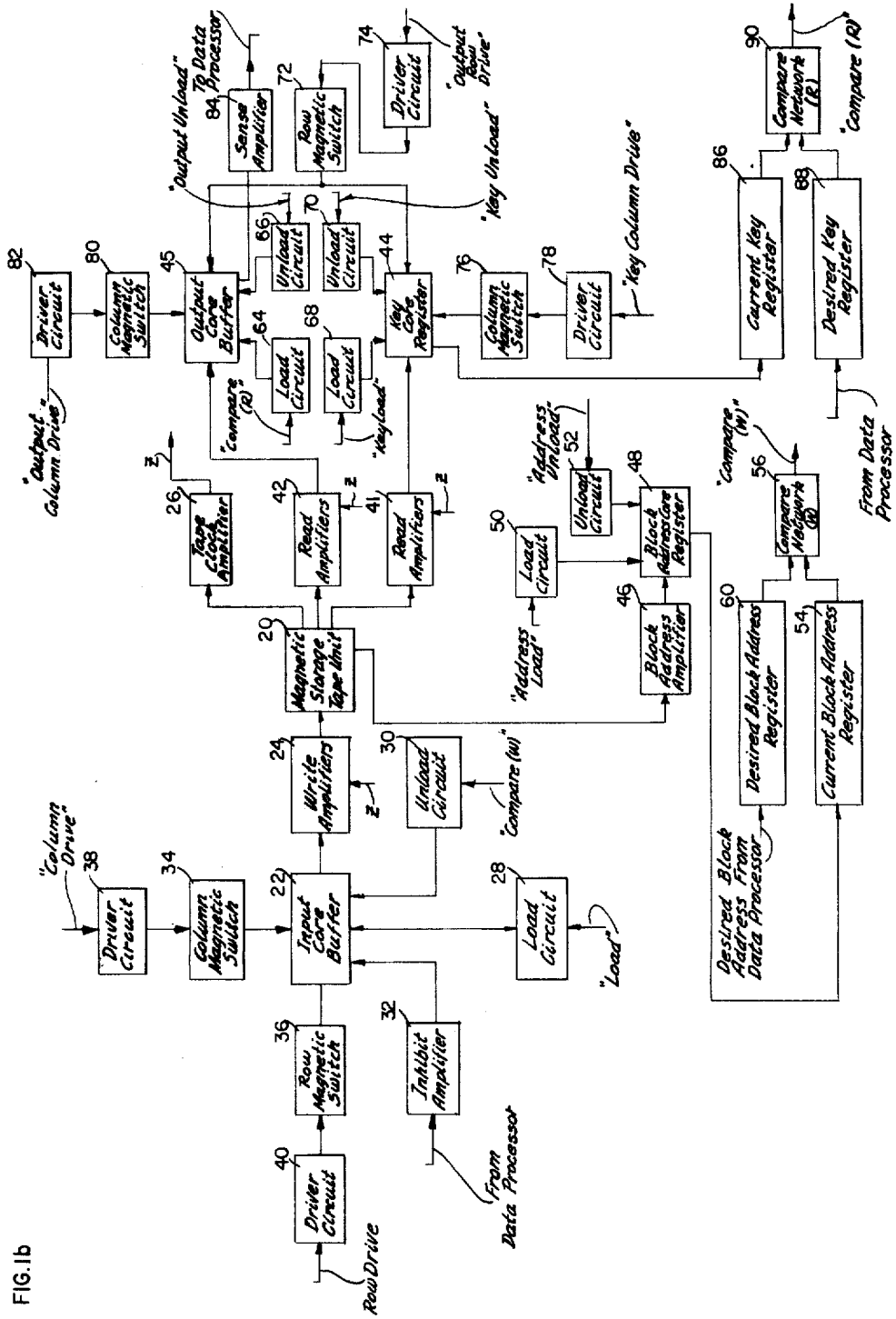

The block diagram of FIGURE 1B illustrates the memory system of the invention in somewhat greater detail. The magnetic storage tape unit is again designated as 20 in FIGURE 1B, and it includes the magnetic storage tape referred to above and its associated read and write transducer heads. The system of FIGURE 1B also includes an input core buffer 22 which is connected to a plurality of write amplifiers 24. The write amplifiers are, in turn, connected to respective ones of the write heads in the magnetic storage tape unit.

The write amplifiers 24 function in a manner described in the copending application 737,862, under the control of a signal "Z" which corresponds to clock pulses recorded on the tape, as will described. The signal "Z" is in the form of a series of pulses, and these pulses are derived from an amplifier 26 which is designated the "tape clock amplifier" and which is coupled to a particular read head in the magnetic storage tape unit 20. This read head is positioned to read one of the channels of the magnetic tape, and clock pulses of a fixed repetition frequency are recorded in that channel.

The input core buffer 22 is under the control of a load circuit 28 and of an unload circuit 30. An inhibit amplifier 32 is connected to the input core buffer 22, and this amplifier serves to feed each block of data with its included key information from the data processor in serial form into the input core buffer 22. The input core buffer 22 is controlled by a column magnetic switch 34 and by a row magnetic switch 36. The column magnetic switch 34 is driven by a driver circuit 38, and the row magnetic switch 36 is driven by a driver circuit 40.

A first plurality of read heads included in the storage tape unit 20 are connected to a corresponding plurality of read amplifiers 41, and a second plurality of read heads in the unit 20 are connected to a corresponding plurality of read amplifiers 42. These read heads sense the signals recorded in different channels on the magnetic tape, the read heads of the first plurality of sensing the recorded signals a predetermined time interval before the read heads of the second plurality. The read amplifiers included in the block 41 are connected to a key core register 44, the read amplifiers in the block 42 are connected to an output core buffer 45.

A further read head in the magnetic tape unit 20 is connected to a block address amplifier 46. This latter read head is positioned to read a channel on the tape on which signals corresponding to the different block addresses are recorded. The block address amplifier 46 develops groups of signals which correspond respectively to the different fixed block addresses on the storage tape. These block address signals are introduced to a block address core register 48. The block address core register 48 includes a load circuit 50 and an unload circuit 52. The block address core register 48 is connected to a current address register 54. This current address register is connected to a compare network 56. A desired block address register 60 is also connected to the compare network 56.

The connections and structural composition of the units referred to above have been described in detail in the copending application 737,862, and will be described in some detail subsequently herein. The input core buffer 22, as described in that application, includes a plurality of magnetic cores and is capable of storing binary signals representing a block of data from the associated data processor, which block also includes in accordance with the concepts of the present invention, key information pertaining to the data of the particular block.

The data processor feeds the block of data through the inhibit amplifier 32 into the input core buffer 22. The input core buffer, at this time, is conditioned to a loading mode by the introduction of a "load" signal to the load circuit 28, this latter signal being derived from the data processor. A "row drive" signal is introduced to the driver circuit 40, and a "column drive" signal is introduced to the driver circuit 38. These signals cause the driver circuits to actuate the row magnetic switches in the unit 36 and the column magnetic switches in the unit 34 in known manner so that the input core buffer 22 may be sequentially activated with respect to its individual cores to permit the incoming information to be stored in the buffer. The "row drive" and "column drive" signals are derived from the data processor for this storing operation. This permits the input core buffer to be properly synchronized with the data processor so that the block of data from the data processor may be read into the input core buffer with the proper timing Signals corresponding to the desired block address on the magnetic tape in the unit 20 at which the data now stored in the input core buffer 22 is to be recorded are introduced to the desired block address register 60 from the data processor. The desired block address register 60, and the current address register 54, may both be of the circulating type, as described in detail in the copending application 737,862.

Now that the block of information has been stored in the input core buffer 22, the memory system enters its "search" phase. For that phase, the block address read head in the unit 20 successively reads the block addresses recorded on the magnetic storage tape in that unit. The signals corresponding to those addresses are read through the block address amplifier 46 into the block address core register 48. The load circuit 50 has an "address load" signal introduced to it just prior to the introduction of signals corresponding to a block address from the amplifier 46. This permits such signals to be stored in the block address core register 48. Then, and before the next group of signals from the block address amplifier 46 arrives, an "address unload" signal is introduced to the unload circuit 52 to cause the block address core register 48 to be conditioned to an unload mode so that the previous block address signals may be introduced at the proper time to the current address register 54. Appropriate switching circuits, as will be described in conjunction with FIGURES 11 and 12, are incorporated in the block address core register to enable the signals to be stored in the register and subsequently read out of the register.

Therefore, signals are introduced to the current address register 54 which correspond to successive block addresses, as such block addresses are read from the magnetic tape in the storage unit 20. The block addresses from the current address register 54 are introduced to the compare network 56 in a serial manner together with the signals from the desired address register 60. The compare network 56, as described in the copending application 737,862, is capable of comparing these signals.

Therefore, the desired address in the register 60 is compared in the compare network 56 with each address from the current address register 54, and this continues until a comparison is achieved. When this occurs, the compare network 56 developes a "compare (W)" signal. This latter signal is introduced to the unload circuit 30 at the proper time to permit the contents of the input core buffer 22 to be written through the write amplifiers 24 into the proper location on the magnetic tape in the storage unit 20, as designated by the block address set up in the register 60. During this time, the "column drive" and "row drive" signals introduced to the driver circuits 38 and 40 are synchronized with the tape unit 20, so that the data in the input core buffer may be written on the magnetic tape with the proper timing.

The block address signals on the magnetic tape are read and introduced to the block address amplifier 46 a sufficient time before the corresponding block location on the tape represented by them is in position for receiving signals from the write amplifiers 24, so that the necessary comparison may be made by the compare network 56 between each "current" block address in the current block address register 54 and the "desired" block address in the register 60.

The "address load" signal introduced to the block address core register 48 is synchronized in any suitable manner with the information on the magnetic tape so that the block address core register may be conditioned for loading just before each current block address is read through the block address amplifier 46. In like manner, the "address unload" signal introduced to the block address core register 48 is synchronized with the information on the tape so that the current block address in the block address core register may be read into the current block address register 54 with a selected precise timing. This selected timing is such that if equality does occur between the current block address in the register 54 and the desired block address in the register 60, the "compare (W)" signal developed by the network 56 as a result of such equality, will originate at the proper time to cause the information in the input core buffer 22 to be written at exactly the proper location on the magnetic tape. As will be described, the "compare (W)" signal continues for a full block time to permit the entire block of data from the input core buffer 22 to be read onto the magnetic tape.

The output core buffer 45 is loaded under the control of a load circuit 64 and unloaded under the control of an unload circuit 66. This buffer and its associated load and unload circuits may be similar in some respects to the input core buffer 22 and its associated load and unload circuits 28 and 30. They key core register 44 includes a similar load circuit 68 and a similar unload circuit 70. A row magnetic switch 72 controls the row loading of both the output core buffer 45 and the key core register 44. A driver circuit 74 controls the operation of the row magnetic switch, and the driver circuit responds to an "output row drive" control signal to achieve this.

A column magnetic switch 76 is connected to the key core register 44 to control the column actuation of the key core register. A driver circuit 78 is connected to the column magnetic switch 76 to control that unit, and the driver circuit responds to a "key column drive" signal to achieve that purpose. A separate column magnetic switch 80 is connected to the output core buffer 45 to control the columns in the output core buffer, and a driver circuit 82 controls the operation of the column magnetic switch 80. The driver circuit 82 responds to an "output column drive" control signal to drive the column magnetic switch 80 at the proper times. The output core buffer 45 is connected to a sense amplifier 84 which, in turn, is connected to the data processor to supply the data from the output core buffer to the data processor.

The key core register 44 is connected to a current key register 86. This register, together with a desired key register 88, is connected to a compare network 90. The registers 86 and 88 may be similar to the registers 54 and 60 which were mentioned above, and as noted, these registers may be of the circulating type.

As mentioned above, in accordance with the concepts of the present invention, a block of information may be selected from the magnetic storage tape in the unit 20 on the basis of a key which is included in the block of data, and which refers to the data itself, rather than to a particular location on the magnetic storage tape in the unit 20. To select a desired block of data, signals corresponding to its key are introduced from the data processor to the desired key register 88. The memory system now enter a second type of "search" mode, and the keys of successive blocks of data are read during this latter mode and signals corresponding to those blocks are amplified by the read amplifiers 41 and introduced into the key core register 44. However, no information is retained in the output core buffer 45 until a desired key is reached.

The key portions of each successive block read during the above mentioned search mode, however, are successively stored in the key core register 44. A "key load" signal is introduced to the load circuit 68 at the proper time to cause the key portion of each data block, as read by the read heads of the first plurality and amplified by the read amplifiers 41, to be stored in the key core register 44. Then, a "key unload" signal is introduced to the unload circuit 70 at the proper time, and before the next key is introduced to the key core register 44, so as to permit the previous key to be introduced into the current key register 86. The "key load" signal is synchronized with the magnetic tape unit 20 to occur at the proper times. The "key unload" signal is synchronized with the data processor to occur at a proper timing with respect to the signals introduced from the data processor into the desired key register 88.

When a comparison is achieved between the key signals in the current key register 86 and the key signals in the desired key register 88, the compare network 90 produces a signal "compare (R)." This signal is introduced to a the load circuit 64 to permit the corresponding block of data to be stored in the output core buffer 45.

The "key load" signal introduced to the load circuit 68 is synchronized in any appropriate manner with the information on the magnetic tape in the unit 20, as mentioned above. This synchronization is such that the key core register 44 will be conditioned to a loading mode each time the key portion of a block of data on the magnetic tape is read by the read heads of the first plurality.

The "key unload" signal introduced to the unload circuit 70 is timed, as mentioned above, in any appropriate manner with the data processor. This latter timing is such that each key will be unloaded from the key core register 44 into the current key register 86 with a precise timing. This timing is such that when an equality between a key in the current key register 86 and the desired key from the data processor in the desired key register 88 is achieved, the signal "compare (R)" will be developed at the precise time the read heads of the second plurality start to read the block of data on the magnetic tape corresponding to that key. The "compare (R)" signal is introduced to the load circuit 64 to cause the output core buffer 45 to be set to a loading mode at the proper time, so that it may receive the signals from the read amplifiers 42 corresponding to the desired block of data.

The desired block of information is now loaded into the output core buffer 45. During this operation, and during the operation in which each successive key is loaded into the key core register 44, the "output row drive" the "output column drive," and the "key column drive" signals are under the timing control of the magnetic tape storage unit 20. This is so that information from the magnetic tape may be read into the output core buffer 45 and key core register 44 with the proper clock timing. Likewise, the "output drive" and the "key column drive" signals are under the timing control of the magnetic tape unit 20 when the contents of the key core register 44 are read into the current key register 86. This is to enable the contents of the key core register to be read into the current key register 86 with the proper clock timing with respect to the information on the storage tape.

On the receipt of an "output unload" signal from the data processor, the contents of the output core buffer 45 are introduced through the sense amplifier 84 to the data processor. The "output row drive" and "output column drive" signals are now under the timing control of the data processor to enable the contents of the output core buffer 45 to be introduced to the data processor with the proper clock timing.

The data processor now receives the desired block of data from the output core buffer 45. The system of FIGURE 1 permits, therefore, a selection of a block of information to be made from the memory system on the basis of key information related to that block, and without any necessity of relating the block to an arbitrarily located address in the system.

As illustrated in FIGURES 2, 3 and 4, the magnetic storage tape unit 20 includes a magnetic tape 10. The tape itself may be composed of known magnetic material exhibiting a relatively high magnetic coercive force. For example, a suitable magnetic material coated on a polyester designated "Mylar" by the E. I. du Pont de Nemours Company has been used successfully as magnetic storage tapes. Thirty five millimeter cellulose tapes coated with magnetic oxides have also been used successfully.

The tape used in the constructed embodiment of the invention is provided with sixteen imaginary channels which extend lengthwise of the tape. The data may be written onto the tape by a plurality of write heads respectively associated with the different channels, and the data may be read from the tape by a corresponding first plurality of read heads and by a corresponding second plurality of read heads, as described above. In the constructed embodiment of the invention, however, multiple element heads are used for reading and writing the data. For example, and as illustrated in FIGURE 2, a first multiple element write head (designated $A_w$) may be used to write data in the channels 1, 3, 5, 9, 11, 13 and 15; and a pair of multiple element read heads ($A_r$), ($A_r'$) are provided for reading the data in those channels. Likewise, a second multi-element write head, designated ($B_w$), may be provided for writing data in the channels 2, 4, 6, 10, 12, 14 and 16; and a corresponding pair of multi-element read heads ($B_r$), ($B_r'$) may be used for reading the data in those channels. The multiple element read head $A_r'$ is displaced along the tape from the multiple read head $A_r$ to read the odd channels earlier, for reasons to be explained. Likewise, the multiple element read head $B_r'$ is displaced along the tape from the multiple element read head $B_r$ to read the even channels earlier for reasons to be described.

The multi-channel read heads and write heads are mounted in a staggered relationship, as is well known, with their respective elements in magnetically coupled relationship with the different channels on the tape. The read heads ($A_r$) and ($B_r$) correspond to the read heads of the first plurality, referred to above, and which are connected to the read amplifiers of the block 41 in FIGURE 1B. The read heads ($A_r'$) and ($B_r'$), on the other hand, refer to the read heads of the second plurality, referred to above, and which are connected to the read amplifiers of the block 42 in FIGURE 1B.

The data is recorded on the tape in the form of characters. Each character is made up of seven binary bits, and these bits are recorded simultaneously by the elements of the write head ($A_w$) or the write head ($B_w$) in the different channels on the tape. The resulting configuration of the data on the tape is in the form of pairs of seven-bit characters in the different interlaced channels. The tape clock pulses "Z" are recorded in the central channel 7 so as to avoid the effects of skewing of the tape, and the clock pulses serve to time successive pairs of characters. Each word on the tape represents twelve characters, or six pairs, as represented by a corresponding six clock pulses in the 7th channel. A block on the tape is composed of eight words, this being indicated in FIGURE 3. The addresses for the blocks are recorded in channel 8, and these block addresses are read by individual heads, as will be described in conjunction with FIGURE 5. As indicated in FIGURE 3, the first 18 characters in the block contain information pertaining to the key portion of the block.

As noted, the 7th channel on the tape has clock pulses recorded in it. These pulses are all of the same magnetic polarity, and they are recorded at fixed equi-distant positions along channel 7 of the tape. These clock pulses, as explained, correspond to the position of successive pairs of characters recorded on the tape. Each character is made up, as mentioned, of seven binary bits, and the arrangement is such that two characters are recorded in each column extending transversely across the tape as represented by a clock pulse in channel 7.

The write heads ($A_w$) and ($B_w$) are staggered and as mentioned above, the write head ($A_w$ writes data in the channels 1, 3, 5, 9, 11, 13 and 15, and the write head ($B_w$) writes data in the channels 2, 4, 6, 10, 12, 14 and 16. Therefore, in each column on the tape as represented by a clock pulse in the clock channel 7, the first write head ($A_w$) writes one character and the second write head ($B_n$) writes a second character. Each of these characters is made up of seven binary bits of successive digital significance, and the bits of each character are simultaneously written on the tape.

The characters are arranged on the tape, as shown in FIGURE 3 and as noted briefly above, in a succession of words, with each word being made up of six pairs of characters. Therefore, each word extends along the tape a distance corresponding to six clock pulses in channel 7. The words themselves are arranged into blocks with each block being made up of eight words. As previously mentioned, each block contains all the relevant data pertaining to a particular item and also key information relating to that item. The beginning of each new block is marked by a block address which is recorded in channel 8, for example, in binary code.

In one constructed embodiment of the invention, the magnetic tape which is designated 10 in FIGURES 2, 3 and 4 was provided with a typical length of 150 feet and a typical width of 35 millimeters. This tape had sufficient dimensions to contain 3750 blocks of data. The tape was included in apparatus such as that disclosed in copending application Serial No. 668,356 which was filed June 20, 1957, in the name of the present inventor.

As shown in FIGURE 4, for example, the fixed block address signals in channel 8 may be displaced in a direction of tape motion from their corresponding block locations. This permits a particular block address on the tape to identify the block location following the one physically adjacent that particular block address. For example, the recorded signals in channel 8 corresponding to a given fixed block address may be related to the recorded block information signals associated with that address by a forty-eight clock pulse delay. This provides a sufficient time delay from the sensing of a fixed block address to the actual reading of its corresponding block of data to permit the necessary controls to be initiated. The same effect can be accomplished, of course, by physically displacing the read head associated with the block address channel 8 a sufficient distance to provide the required time interval between the sensing of a block address and providing proper controls as a result of such sensing. As also mentioned, the fixed block address signals may be arranged in channel 8 in numerical sequence.

As noted above, the block diagram of FIGURE 5 represents in more particular detail the composition of one embodiment of the invention. Certain ones of the blocks in FIGURE 5 correspond to those in the block diagram of FIGURE 1b, and these have been given the same numerals. Circuit details of the system of FIGURE 5 will be described subsequently. The system of FIGURE 5, as was the case with the system of FIGURE 1b, is capable of selecting recorded blocks of information from a magnetic storage tape unit on the basis of key information included in the data itself.

The system of FIGURE 5 includes first and second separate clock read heads in the magnetic storage tape unit 20. Both these read heads are associated with the clock channel 7 of the storage tape 10 (FIGURES 2 and 3). However, the first read head reads the clock pulses slightly ahead of the second. The resulting clock signals ($Z_r$) from the first clock read head are used for controlling the components used for the reading of information from the magnetic tape, and the clock signals ($Z_w$) from the second clock read head are used to control the components used for writing information on the magnetic tape. The displacement of the signals from the first and second read heads is not as great as the interval between successive clock pulses. This arrangement permits the components concerned with reading data from the magnetic storage tape to be clocked slightly ahead of time so that such components may be in a full receptive state for the corresponding information as it is read from the tape.

The first clock read head is coupled to a clock amplifier 100, and the second clock read head is connected to a clock amplifier 102. The amplifier 100 develops a series of clock pulses ($Z_R$), and the amplifier 102 develops a series of clock pulses ($Z_W$). As noted above, the clock pulses ($Z_R$) are displaced slightly ahead of the clock pulses ($Z_W$).

The magnetic storage tape unit 20 of FIGURE 5 also has a pair of read heads in magnetically coupled relationship with the block address channel 8 (FIGURES 2 and 3) of the magnetic storage tape. The first read head reads the block address signals and supplies them to a block address read amplifier (W) 104. The second block address read head is connected to a block address read amplifier (R) 106, and it supplies signals corresponding to the block addresses to the block address read amplifier 106.

The block address read amplifier 104 is connected to a block address core register 108. The core register 108 has a load circuit 110 associated with it, and it also has an unload circuit 112 associated with it. A "block address load (W)" signal, which is synchronized with the information on the magnetic tape in the unit 20, is introduced to the load circuit 110 to cause each block address successively received from the block address read amplifier 104 to be stored in the core register 108. Then, a "block address unload (W)" signal is introduced to the unload circuit 112 to permit the block address in the core register 108 to be introduced to a block address sense amplifier (W) 114. The amplifier 114 is connected to the current block address register 54. The "block address unload (W)" signal is also synchronized with the information on the magnetic tape in the unit 20, and this signal is timed so that each block address is introduced into the register 54 with a timing such that when the desired block address is reached the contents of the input buffer 22 may be fed with the proper timing to the storage tape.

The block address core register 108 is controlled by a plurality of magnetic switches 116, and these are driven by appropriate driver circuits 118. An "address row driver (W)" control signal is introduced to the driver circuits 118. This control signal is also synchronized with the information on the magnetic storage tape so that the block addresses may be read in and out of the core register 108 with the proper timing.

In the system of FIGURE 5, the magnetic storage tape unit 20 may be searched simultaneously for a plurality of information blocks corresponding to a like plurality of keys in the respective blocks. For this purpose, an eight word circulating register 120 is included in the system. Signals corresponding to the keys of the different desired information blocks are introduced into the register 120. A further group of signals may also be stored in the register 120 corresponding to the block address of the information block to be written from the input core buffer 22 into the location in the magnetic storage tape unit 20 designated by that address. The register 120 may be an eight word circulating register, as mentioned above, and the signals corresponding to the particular block address and the various keys circulate in serial manner in the register. The block address may correspond to one word, as may each key.

The input core buffer 22 may be loaded with a block of information from the data processor in the manner described in conjunction with the system of FIGURE 1b.

The next step is to unload the input core buffer into the magnetic tape unit 20 at the address on the tape designated by the block address in the register 120.

The desired key register 120 is connected to the compare network (W) 56, as is the current block address register 54. As in the system of FIGURE 1b, when a comparison is achieved between the desired block address in the register 120 and the current block address in the register 54, the compare network 56 develops a "compare (W)" control signal which is introduced to the unload circuit 30 of the input core buffer 22. The block addresses circulating in the registers 54 and 120 have a selected timing so that the "compare (W)" signal, is produced with a timing such that the contents of the input core buffer 22 may be read into the designated location on the storage tape in the magnetic storage tape unit 20.

As in the previous system of FIGURE 1b, the magnetic storage tape unit 20 is connected to the plurality of read amplifiers 41 which, in turn, are connected to the key core register 44, and to the plurality of read amplifiers 42 which are connected to the output core buffer 45. The key core register 44 is connected to a key sense amplifier 120 which, in turn, is connected to the current key register 86. The register 86 may be of the circulating type, and it is capable of storing one word of information. The current key register 86 contains key information from the successive blocks of information read from the magnetic storage tape unit by the read amplifiers 41. This register is connected to the compare network 90, as mentioned in conjunction with FIGURE 1.

The magnetic storage tape unit 20 also includes a plurality of additional read heads which are connected to a corresponding plurality of read amplifiers 121. These read heads are positioned to read the information of the tape in the unit 20 after the reading by the read heads connected to the read amplifiers 41. The read amplifiers 121 are connected to a compare key core register 122 which may be similar to the key core register 44.

The compare key core register 122 is connected to a compare key sense amplifier 123 which, in turn, is connected to the "or" gate 150. The compare key core register 122 has a load circuit 125 connected to it, and it also has an unload circuit 127 connected to it. The "compare (R)" signal from the compare network 90 is introduced to the load circuit 125, and a "compare key unload" signal from the data processor is introduced to the unload circuit 127. Likewise, the row magnetic switch 72 controls the row switching of the register 122, and the column magnetic switch 76 controls its column switching.

The compare key register 122 is controlled so that the signals introduced to that register represent the key portion of a block of information corresponding to one of the desired blocks, and these signals are introduced to the compare key register 122 only when a desired block of information is in the output core buffer 45. The desired key register 120 is also connected to the compare network 90, and the compare network develops an output signal "compare (R)" whenever a comparison is made between one of the desired keys and the key of a block of data read from the magnetic storage tape unit 20.

The system also includes an 8-word masking (Q) register 124, and masking signals may be introduced into that register to render ineffective any desired portions of the selected keys stored in the register 120. This enables more general comparison to be made on the basis of equality with portions only of the keys in the register 120. The masking register 124 may also be of the 8-word circulating type.

The data sense amplifier 84 of the output core buffer 45 is connected to an "or" gate 150. The compare key register is also connected to the "or" gate 150.

The block address read amplifier 106 is connected to a block address core register (R) 126. The block address core register (R) 126 is driven by a magnetic switching unit 134 which, in turn, is driven by a driver circuit 136. An "address row driver (R)" signal, synchronized by the information in the storage tape unit 20, is introduced to the driver circuit 136. The block address core register (R) 126 is connected to a block address sense amplifier (R) 128 which, in turn, is connected to the "or" gate 150. The block address core register 126 and the block address core register 108 may both be similar in their construction.

The block address core register 126 has a load circuit 130 associated with it, and it has an unload circuit 132 also associated with it. The load circut 130 responds to the "compare (R)" control signal from the compare network 90, and the unload circuit 132 responds to a "block address unload (R)" control signal. The "block address load (R)" control signal is timed so that the block address of the selected block from the read amplifier 106, may be inserted in the block address core register (R) 126. The "block address unload (R)" signal is timed so that the block address of the selected block of information in the output core buffer 45 will be read into the data processor just prior to the block itself.

The signal passed by the "or" gate 150 is introduced to the data processor. This signal includes the selected block of data from the output core buffer 45, its corresponding key portion from the compare key register 122, and its block address from the sense amplifier 128.

It should be pointed out that the block addresses introduced to the block address read amplifier (W) 104 have an appropriate timing to control the writing of a block of information from the input buffer 22 on the magnetic tape in the unit 20. The block addresses introduced to the block address read amplifier (R) 106, on the other hand, have appropriate timing to be introduced to the data processor with a corresponding block of data from the output buffer 45.

In the system of FIGURE 5, therefore, a plurality of blocks of information may be stored at successive block address locations on the tape in the unit 20. This is achieved in each instance by introducing the block of information to the input core buffer 22, and by inserting a vacant block address in the register 120. The system is then put in a first tape search mode, and when the corresponding address appears in the current block address register 54, the block in the input core buffer 22 is read into the appropriate block address location on the magnetic tape in the unit 20.

The operations described above may be continued until a plurality of blocks of information are loaded on the tape in the unit 20. These blocks, as explained, are situated at different block addresses on the tape. Now, when a particular block is required by the data processor, that block is selected, not on the basis of its arbitrarily selected block address on the tape, but on the basis of its own individual key.

To select such a block of information for the data processor, the key allocated to that block is inserted into the register 120. When the corresponding key appears in the current key register 86, the compare network 90 develops the "compare (R)" signal. This signal is introduced to the load circuit 64, to the load circuit 125, and to the load circuit 130. This, in turn, causes the required data block to be loaded into the output core buffer 45, the key associated with that block to be loaded into the compare key core register 122, and the block address of the required block to be loaded into the block address core register (R) 126.

During this loading of the core registers 44, 45, 122 and 126, the "output column drive," the "output row drive," the "key column drive," and the "address row drive (R)" control signals are synchronized with the magnetic tape unit 20, so that the corresponding signals may be loaded into these registers with the proper timing.

When the data processor is ready for the block of information in the output core buffer 45, it introduces the "block address unload (R)" signal to the unload circuit 132 of the block address core register 126 so that the block address in the register 126 may be introduced to the data processor. The data processor then introduces the "compare key unload" signal to the unload circuit 127 of the compare key core register 122 so that the key of that block can be introduced to the data processor. Finally, it introduces the "output unload" signal to the unload circuit 66 of the output core buffer 45 so that the block of data in the output core buffer 45 may be introduced to the data processor.

During this unloading of the core registers 44, 45, 122 and 126, the "output column drive," the "output row drive," the "key column drive" and the "address row drive (R)" control signals are synchronized with the data processor so that the corresponding signals may be loaded into the data processor with the proper timing.

When the data processor is through with the block of information, it is inserted in the input buffer 22. The block address, at the same time is inserted in the register 120. Then, in the manner described above, the block of data is returned to its original position on the magnetic tape in the unit 20.

The circuit details of the block address core register (R) 126 of FIGURE 5, and its associated control networks and components, will now be described in conjunction with FIGURES 6–12. It will be understood that the block address core register (W)) 108 and its associated components may have a similar construction. The purpose of the block address core register 126 is to receive the binary signals corresponding to the block address in the channel 8 (FIGURE 3) of a block of data required by the data processor and to store those signals for subsequent introduction to the data processor. For that purpose, the block address core register 126 is unloaded at the proper time to introduce the signals corresponding to the block address through the "or" gate 150 to the data processor. This latter time is so chosen that the signals representing the block address may be introduced to the data processor 150 in serial manner, to be followed by signals serially representing the block of data from the output core buffer 45 and representing the key information from the key register 122.

The block address core register 126 may be any known type of core register. For example, this register may be of the type using cores manufactured by the Radio Corporation of America and designated by them as their 222M2 core type. The illustrated register in FIGURE 6 is made up of sixteen toroidal magnetic cores, and a different binary digit stored in each of the cores, the resulting sixteen binary digits make up the corresponding block address.

Figure 6:
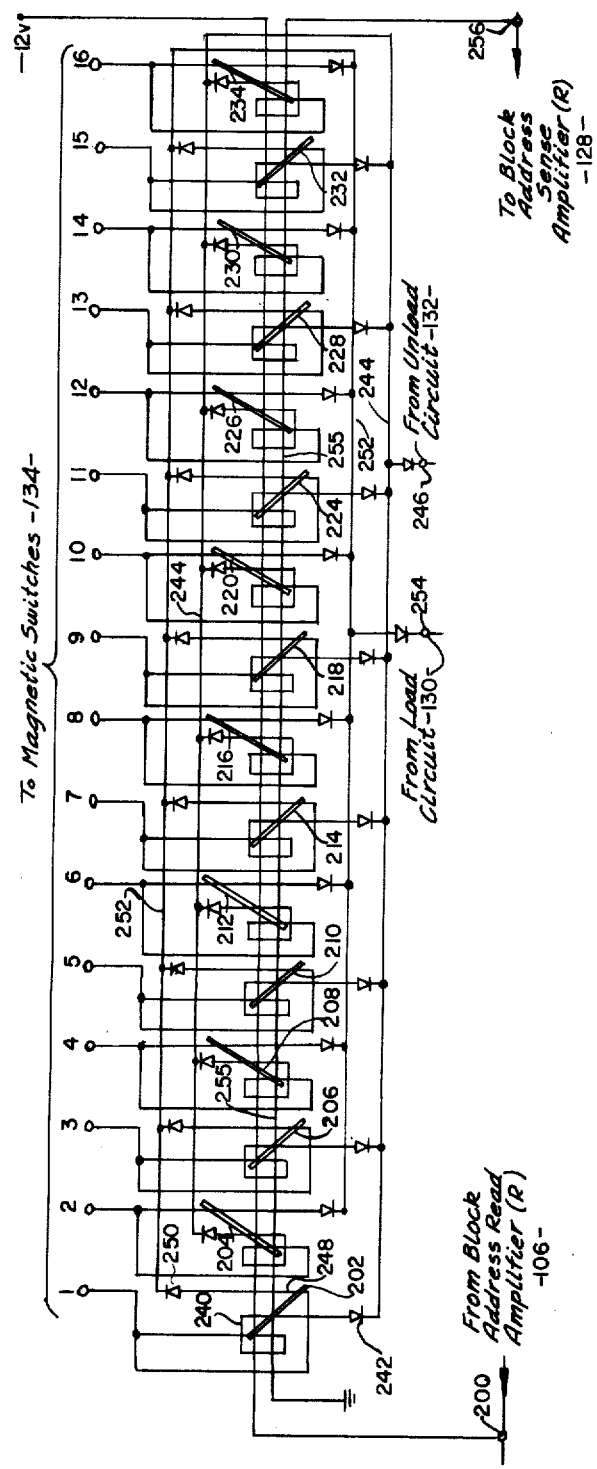
FIGURE 6 is a circuit diagram of a magnetic core register used in the system of FIGURE 5.

The core register 126 of FIGURE 6 has an input terminal 200 which is connected to the block address read amplifier (R) 106 of FIGURE 5, and which receives serial signals from the read amplifier corresponding to each group of signals representing the different block addresses in channel 8 on the magnetic tape (FIGURES 2 and 3). The input terminal 200 is connected to a winding which extends through all the cores of the register and which is connected at its remote end to the negative terminal of a 12 volt direct voltage source, the positive terminal of this source being connected to a point of reference potentials, such as ground. The different magnetic cores in the core register 126 of FIGURE 6 are designated 202, 204, 206, 208, 210, 212, 214, 216, 218, 220, 224, 226, 228, 230, 232 and 234, respectively. The core register 126 also includes a group of switching terminals 1–16 which are connected to respective magnetic switches in the block 134 of FIGURE 5. These magnetic switches introduce signals successively to the switching terminals 1–16, as will be described in conjunction with FIGURE 7.

The switching terminal 1 is connected to a winding 240 associated with the core 202 and which has two turns. The remote end of the winding 240 is connected to the anode of a diode 242, and the cathode of the diode is connected to a common lead 244, the common lead being connected to an input terminal 246 which receives an unloading signal from the unload circuit 132.

The switching terminal 1 is also connected to a winding 248 which also extends through the core 202 and has but one turn. The remote end of the winding 248 is connected to the anode of a diode 250. The cathode of the diode 250 is connected to a common lead 252, and the common lead connects with an input terminal 254 which receives a signal from the load circuit 130. The other switching terminals are connected to similar windings associated with corresponding ones of the other magnetic cores in the core register. An output winding 255 is linked through all the cores in the register. One terminal of the winding 255 is grounded, and the other is connected to an output terminal 256.

When the core register 126 is to be loaded, the load circuit 130 completes a circuit from the input terminal 254 to the common lead 252, and the unload circuit 132 provides an open circuit for the common lead 244. Then, the introduction of a switching signal to the terminal 1 causes a current to flow through the winding 248 and through the diode 250 to the lead 252. This winding is in a direction but that it tends to "turn" the core 202 from a magnetic condition representing binary 0 to a magnetic condition representing binary 1. However, this current is insufficient in and of itself to accomplish that effect. Only the coincidence of additional current at the input terminal 200 causes the core 248 to be turned to the binary 1 condition. Likewise, the input signal at the terminal 200 is insufficient in and of itself to change the magnetic condition of the core 202.

Therefore, when the signals introduced to the input terminal 200 serially represent binary 1 or binary 0, the coincidence of corresponding switching currents to respective ones of the switching terminals 1–16 causes the corresponding cores to assume a magnetic condition representative of binary 1 for a corresponding signal at the input terminal 200, and a condition representative of binary 0 for a corresponding input signal at the terminal 200.

Then, to unload the register 126, the unload circuit 132 completes a circuit to the common lead 244, and the load circuit 130 causes the common lead 252 to be open circuited. Now, the switching signals are successively introduced to the switching terminals 1, 2, 3 . . . 16. The signal introduced to the switching terminal now flows through the double turn winding 240 and through the diode 242 to the common lead 244. This latter signal flow is in a direction to turn the core 202 to a magnetic condition representative of binary 0. Moreover, the current is sufficient to produce that effect, because the winding 240 has two turns. Therefore, when the register is in its "unload" condition, the successive switching signals returns each of its magnetic cores to its 0 condition. Each core is concomitantly readied for the next introduction of signals, when the register is again returned to its "load" condition.

As each magnetic core is successively turned by the switching signals during the "unload" operation, no signal appears at the output terminal 256 if the corresponding core is already in its 0 condition; however, if a corresponding core was previously turned to its 1 condition, a signal is induced in the winding 255 and produced at the output terminal 256 as that core is returned by the corresponding switching signal to its 0 condition. Therefore, the switching signals cause the binary information stored in the block address core register 126 to appear in serial form at the output terminal 256 for application to the block address sense amplifier (R) 128.

Figure 7:
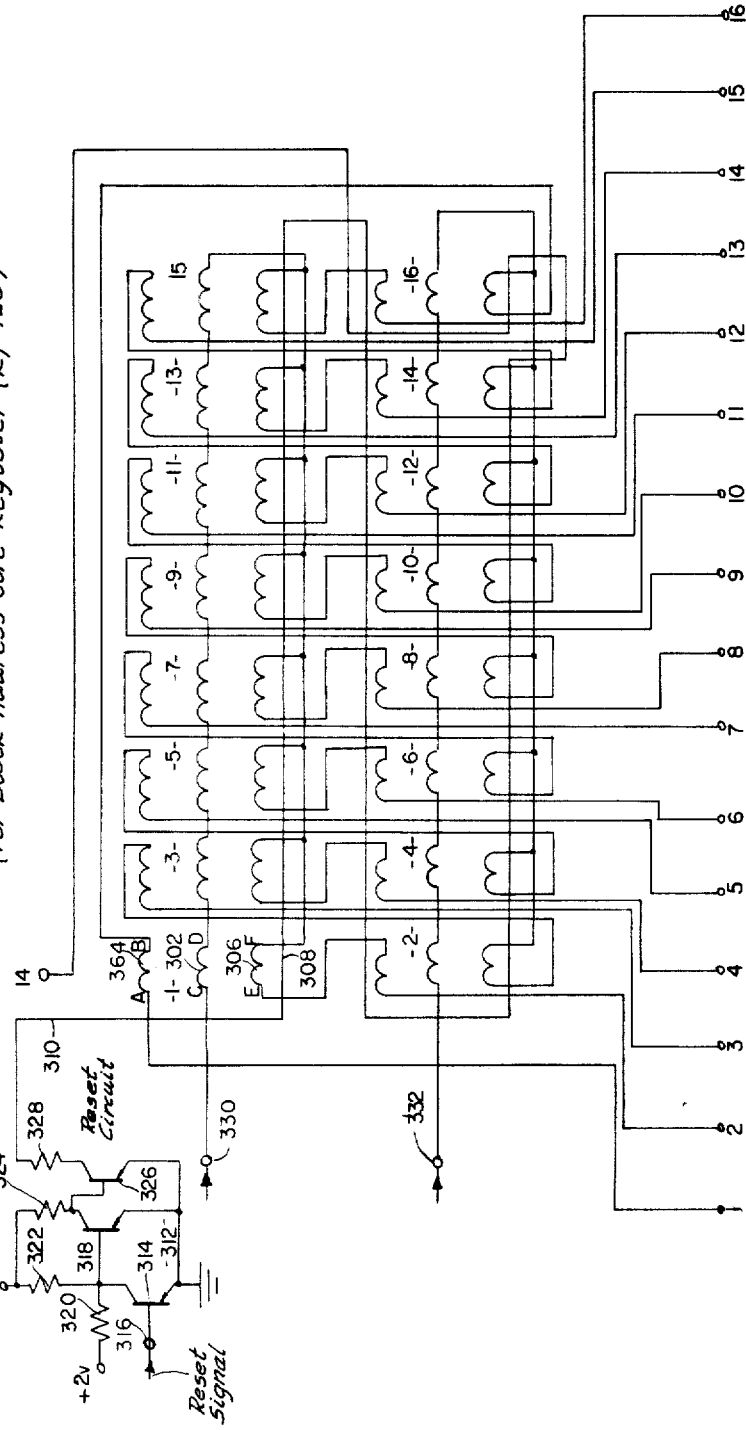
FIGURE 7 is a circuit diagram of a magnetic switch assembly for driving the magnetic core register of FIGURE 7.

The magnetic switches 134 for driving the block address core register 126 are illustrated in more detail in FIGURE 7. These switches comprise a series of toroidal or annular magnetic cores, which may be of the same general type as the cores used in the block address core register of FIGURE 6. However, the cores used in the switches of FIGURE 7 will be much larger than the former cores and have different magnetic characteristics. These magnetic cores of the switches 134 have a relatively high coercivity and a substantially rectangular hysteresis loop. Therefore, a current of sufficient amplitude through each coil associated with the individual cores of the magnetic switches is capable of turning the corresponding core over from one magnetic saturation condition to another, provided that certain magnetic conditions are met.

As shown schematically in FIGURE 7, each of the cores 1–16 has three coils associated with it. For example, the core 1 has the coils 302, 304 and 306 wound about its toroidal surface. This core, like the other cores, also has a reset winding 308 which links all the cores from an input terminal 310 to the negative terminal of a 14 volt direct voltage source, the positive terminal of which is connected to ground. The reset winding 308 threads all the cores in a certain direction, with the exception of core 16. Then, when a current is passed through the reset winding 308, all the cores are returned to a saturation state corresponding to binary 0, except the core 16 which is returned to a saturation state corresponding to binary 1.

A reset circuit 312 is connected to the input terminal 310. The reset circuit includes a transistor 314 of the PNP type and which has its emitter connected to ground. The collector of the transistor 314 is connected to the base of a transistor 318. The transistor 318 also has its emitter connected to ground. Both the transistors 314 and 318 may be of the PNP type. The transistor 314 may be of the type presently designated 2N114, and the transistor 318 may be of the type presently designated 2N316. The base of the transistor 318 is connected to a resistor 320 which may have a resistance of 10 kiloohms, and which is connected to the positive of a 2 volt direct voltage source, the negative terminal of that source being grounded. The collector of the transistor 314 is also connected to a resistor 322 which, in turn, is connected to the negative terminal of the 14 volt direct voltage source. The resistor 322 may have a resistance of 300 ohms.

The collector of the transistor 318 is connected to a resistor 324, of, for example, 100 ohms, and this resistor is connected to the negative terminal of the 14 volt direct voltage source. The collector of the transistor 318 is also connected to the base of a transistor 326. The latter transistor may be of the power type designated 2N156, and its emitter is grounded. The collector of the transistor 326 is connected to a resistor 328. This latter resistor may have a resistance of 10 ohms, for example, and it is connected to the input terminal 310 of the magnetic switches assembly 134.

In response to a reset signal "S" introduced to the input terminal 316, the power transistor 326 is rendered conductive to pass a current through all the cores of the magnetic switches and to reset these cores. As noted above, the cores are all reset to a binary 0 condition, with the exception of the core 16.

As shown in FIGURE 7, the cores of the magnetic switch assembly are divided in two groups. The cores 1, 3, 5, 7, 9, 11, 13 and 15 are in one group which are connected to an input terminal 330; and the cores 2, 4, 6, 8, 10, 12, 14 and 16 are in the second group which are connected to an input terminal 332.

The coil 302, and corresponding coils of the cores in the first group, are connected in series and to the input terminal 330 of the switch. Likewise, the corresponding coils of the second group are connected in series and to the input terminal 332. The coil 304 and corresponding coils associated with the other cores in the first and second groups each has one terminal connected to the output terminals 1–16 of the magnetic switch assembly. The coil 302, and the corresponding coils associated with the other cores in the first and second groups are connected in known manner to complete the circuitry for the magnetic switches 134.

Now, when the cores 1–15 of the magnetic switches of FIGURE 7 have been set to 0, and the core 16 has been set to 1, by the reset signal "S" introduced to the input terminal 316 of the reset circuit 312, and the potential at the input terminal 332 is driven negative. Then, a current pulse flows through the associated coils of the second group to return the core 16 to the 0 state. Then, and in the manner described in more detail in the copending case, the turning of the core 16 to the 0 state causes a current pulse to appear at the output terminal 16, and also causes the core 15 to be turned to the 1 state. The next succeeding negative-going pulse is introduced to the input terminal 330, and it flows down through the coil 302 and through the other coils connected in series with it. This latter current causes the magnetic core 15 to be turned from its 1 saturated magnetic state to its 0 saturated magnetic state. This, in turn, causes a switching pulse to appear at the output terminal 15 and it also causes the core 14 to be turned from the 0 to the 1 condition.

In the manner discussed above, successive negative going pulses introduced first to the input terminal 332 and then to the input terminal 330 cause successive ones of the cores 16, 15, 14 . . . 3, 2, 1 to be turned from the 1 magnetic state to the 0 magnetic state, with the accompanying production of corresponding switching pulses at the output terminals 16, 15, 14, 13, . . . 3, 2, 1.

The switching signals successively produced at the output terminals 16–1 flow through the corresponding coils in the block address register 126 to provide the controls described above. The actuation of the block address core register 126 of FIGURE 6 by the magnetic switches 134 of FIGURE 7 is timed so that the core register 126 will be loaded with signals corresponding to the block address of the information block to be selected by the data processor, as those signals are read through the amplifier 106. Likewise, the timing of the control of the register 126 by the magnetic switches 134 is controlled so that when the register is in an "unload" condition, the block address data in the register will be read at the proper time through the "or" gate 150 into the data processor. This timing of the actuation of the register 126 by the magnetic switches 134 is achieved by the driver circuit 136 of FIGURE 8, and the "address row drive (R)" control signals introduced to the driver circuit.

For loading the block address core register 126, the "address row driver (R)" signal is made up of the clock pulses $Z_r$ from the tape clock amplifier 100 of FIGURE 5, and the "compare (R)" control signal from the compare network (R) 90 of FIGURE 5. For unloading the block address core register 126, the "address row driver (R)" control signal is made up of the clock pulses T, from the data processor and the "block address unload (R)" signal, referred to above, derived from the data processor.

Figure 8:
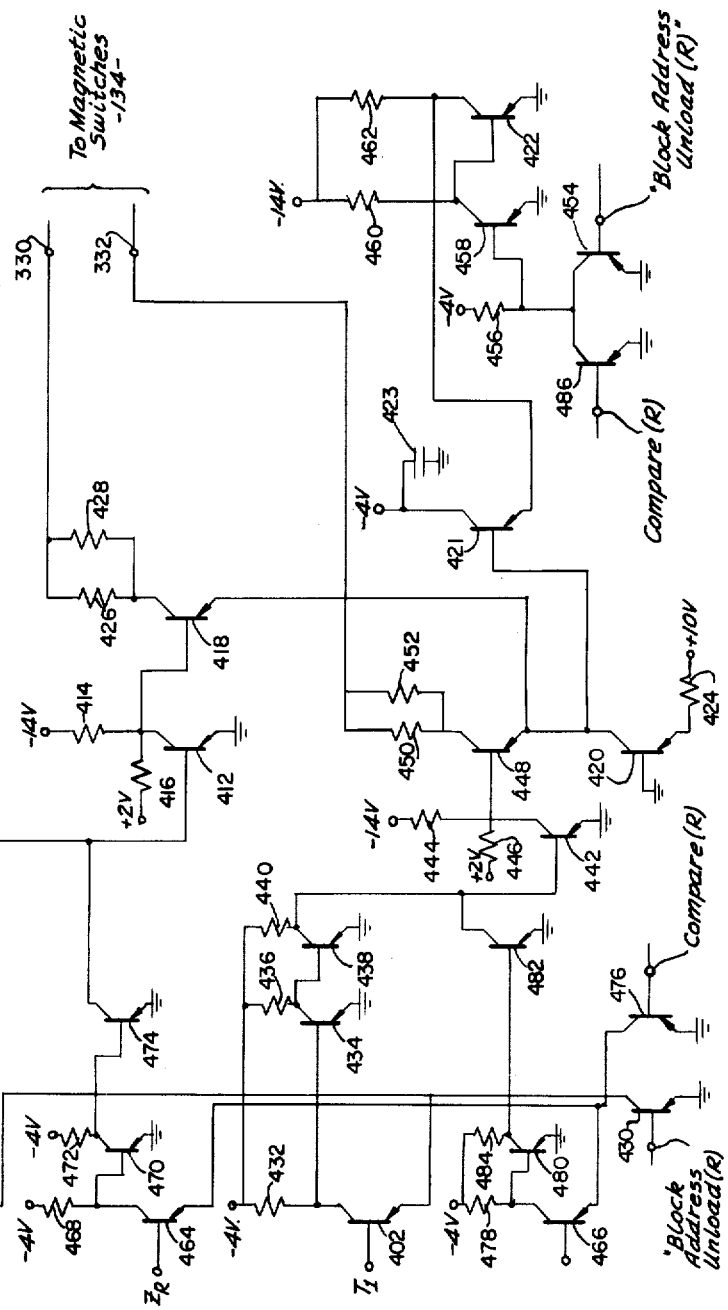
FIGURE 8 is a circuit diagram of a driver circuit for the magnetic switches of FIGURE 7.

The driver circuit 136, as illustrated in FIGURE 8, includes a transistor 400 and a transistor 402. Each of these transistors may be of the PNP type, and they may be of the type presently designated SB100. The clock pulses, designated $T_1$, from the data processor, are introduced to the base of the transistor 402, and the inverted term $\overline{T}_1$ is introduced to the base of the transistor 400. The collector of the transistor 400 is connected to the base of a similar transistor 403 and to a resistor 404. The resistor 404 may have a resistance of 2.2 kilo-ohms, and it is connected to the negative terminal of the 4 volt direct voltage source. The emitter of the transistor 403 is grounded, and its collector is connected to a resistor 406. The resistor 406 may also have a resistance of 2.2 kilo-ohms, and it also is connected to the negative terminal of the four volt direct voltage source.

The collector of the transistor 402 is connected to the base of a transistor 408. The transistor 408 may be of a similar type to the transistors 400 and 402. The emitter of the transistor 408 is grounded, and its collector is connected to a resistor 410 and to the base of a transistor 412. The resistor 410 may have a resistance of 2.2 kilo-ohms, and it is connected to the negative terminal of the 4 volt direct voltage source.

The transistor 412 may be a PNP power transformer of the type presently designated GT763. The emitter of the transistor 412 is grounded, and its collector is connected to the junction of a pair of resistors 414 and 416, and to the base of a second PNP power transistor 418. The resistor 414 may have a resistance of 300 ohms, and it is connected to the negative terminal of the 14 volt direct voltage source. The resistor 416, on the other hand, may have a resistance of 10 kilo-ohms, and it is connected to the positive terminal of the 2 volt direct voltage source.

The transistor 418 may be of the type presently designated 2N316. The emitter of the transistor 418 is connected to the collector of a PNP transistor 420 and to the collector of a PNP transistor 422. The collector of the transistor 420 is connected to the base of a PNP transistor 421. The collector of the transistor 421 is connected to the negative terminal of the 4 volt direct voltage source. The collector of the transistor 421 is also connected to a grounded capacitor 423. This capacitor may have a capacitance, for example, of 20 microfarads. The emitter of the transistor 421 is connected to the collector of a transistor 422. The transistor 420 may be of the type presently designated 2N101, and the transistor 422 may be of the type presently designated 2N417. The transistor 420 serves as a current regulator. The base of the transistor is grounded, and its collector is connected to a resistor 424. The resistor 424 may have a resistance of 100 ohms, and it is connected to the positive terminal of a 10 volt direct voltage source, the negative terminal of which is grounded.

The collector of the transistor 418 is connected to a pair of parallel-connected resistors 426 and 428. Each of these resistors may have a resistance of 2.7 ohms, and they are connected to the input terminal 330 of the magnetic switch assembly 134.

The emitter of the transistor 400 and the emitter of the transistor 402 are connected to the collector of a transistor 430. The latter transistor may be of the PNP type, and of the type presently designated 2N417. The "unload" control signal is introduced to the base of the transistor 430, and the emitter of the transistor is grounded.

The collector of the transistor 402 is connected to a resistor 432 and to the base of a transistor 434. Both the transistors 402 and 434 may be of the PNP type presently designated SB100. The resistor 432 may have a resistance of 2.2 kilo-ohms, and it is connected to the negative terminal of the 4 volt direct voltage source. The emitter of the transistor 434 is grounded, and its collector is connected to a resistor 436 and to the base of a transistor 438. The resistor 436 may have a resistance of 2.2 kilo-ohms, and it is connected to the negative terminal of the 4 volt direct voltage source.

The transistor 438 may be of the PNP type presently designated SB100. The emitter of the transistor 438 is grounded, and its collector is connected to a resistor 440. The resistor 440 may have a resistance of 2.2 kilo-ohms, and it is connected to the negative terminal of the 4 volt direct voltage source. The collector of the transistor 438 is connected to the base of a PNP power transistor 442. The latter transistor may be of the type designated GT763. The emitter of the transistor 442 is grounded, and its collector is connected to the junction of a resistor 444, a resistor 446 and the base of a PNP power transformer 448. The resistor 444 may have a resistance of 300 ohms, and it is connected to the negative terminal of the 14 volt direct voltage source. The resistor 446 may have a resistance of 10 kilo-ohms, and it is connected to the positive terminal of the 2 volt direct voltage source.

The transistor 448 may be a PNP power transformer of the type presently designated 2N316. The emitter of the transistor 448 is connected to the emitter of the transistor 418, and the collector of the transistor 448 is connected to a pair of parallel-connected resistors 450 and 452. Each of the resistors 450 and 452 has a resistance of 2.7 ohms, for example, and these resistors are connected to the input terminal 332 of the magnetic switch assembly 134.

The clock pulses $T_1$, and their inverted terms $\overline{T}_1$, from the data processor are respectively introduced to the base of the transistor 402, and to the base of the transistor 400. However, only in the presence of the "block address unload (R)" signal is the transistor 430 conductive to complete the emitter circuits for the transistors 400 and 402. Therefore, only in the presence of the "block address unload (R)" signal, are the terms $T_1$ and $\overline{T}_1$ amplified and introduced to the terminals 330 and 332 respectively.

The "block address unload unload (R)" signal is timed to occur at the precise moment the block address in the block address core register 126 is to be fed to the data processor. When that occurs, the term $\overline{T}_1$ is amplified by the transistors 400, 402, 408, 410 and 418 and introduced to the input terminal 330 of the magnetic switch assembly 134. Likewise, the term $T_1$ is amplified in the presence of the "block address unload (R)" signal by the transistors 402, 434, 438, 442 and 448, and introduced to the input terminal 332 of the magnetic switch assembly 134.

The "block address unload (R)" signal is also introduced to the base of a PNP transistor 454. This transistor may be of the type designated SB100. The emitter of the transistor 454 is grounded, and its collector is connected to a resistor 456. The resistor 456 may have a resistance of 4.7 kilo-ohms, and it is connected to the negative terminal of the 4 volt direct voltage source. The collector of the transistor 454 is also connected to the base of a transistor 458. The latter transistor may also be of the PNP type, as presently designated 2N417. The emitter of the transistor 458 is grounded, and the collector is connected to the base of the transistor 422 and to a resistor 460. The emitter of the transistor 422 is grounded, and its collector is connected to a resistor 462. The resistor 460 may have a resistance of 5.6 kilo-ohms, and the resistor 462 may have a resistance of 620 ohms, both these resistors being connected to the negative terminal of the 14 volt direct voltage source.

In the absence of the "block address unload (R)" signal at the base of the transistor 454, the emitter circuits of the transistors 418 and 448 are not completed, and no signal can pass to the input terminals 330 and 332 of the magnetic switch assembly 134. However, in the presence of the "block address unload (R)" signal, the emitter circuit for the transistor 418 and the emitter circuit for the transistor 448 are completed. Therefore, so long as the "block address unload (R)" signal is introduced to the transistor 430 and to the transistor 454, the clock pulses $T_1$ and $\overline{T}_1$ from the computer are introduced to the magnetic switches 134 to cause the magnetic switches to control the block address core register 126 and feed the block address signals therein in serial form to the data processor.

The clock pulses $Z_R$ from the tape read clock amplifier 102 are introduced to the base of a transistor 464, and the converse clock pulses $\overline{Z}_R$ are introduced to the base of a transistor 466. Both of these transistors may be of the PNP type designated SB100.

The collector of the transistor 464 is connected to a resistor 468 and to the base of a similar transistor 470. The resistor 468 may have a resistance of 2.2 kilo-ohms, and it is connected to the negative terminal of the 4 volt direct voltage source.

The emitter of the transistor 470 is grounded, and its collector is connected to a resistor 472 and to the base of a transistor 474. Both the transistor 470 and 474 may be of the PNP type, presently designated SB100. The resistor 472 may have a resistance of 2.2 kilo-ohms, and it is connected to the negative terminal of the 4 volt direct voltage source. The transistor 474 has its emitter grounded, and the collector of the transistor is connected to the collector of the transistor 408. The emitter of the transistor 464 and the emitter of the transistor 466 are connected to the collector of a transistor 476. The latter transistor may be a PNP transistor of the type designated SB100. The emitter of the transistor 476 is grounded.

The "compare (R)" signal is introduced to the base of the transistor 476. The transistor 476 is conductive only in the presence of that signal, and it completes the emitter circuits of the transistors 464 and 466 when it is rendered conductive by that signal.

The collector of the transistor 466 is connected to a resistor 478 and to the base of a transistor 480. The resistor 478 has a resistance of 2.2 kilo-ohms, and it is connected to the negative terminal of the 4 volt direct voltage source. The transistor 480 may be of the PNP type, designated SB100, and its collector is connected to the base of a similar PNP transistor 482. The emitters of the transistors 480 and 482 are grounded. The collector of the transistor 480 is connected to a resistor 484 which has a resistance of 2.2 kilo-ohms, and which is connected to the negative terminal of the 4 volt direct voltage source. The collector of the transistor 482 is connected to the collector of the transistor 438.

The "compare (R)" signal is also introduced to the base of a transistor 485. This transistor may be of the PNP type, as designated SB100. The emitter of the transistor 486 is grounded, and the collector is connected to the resistor 456. In the presence of the "compare (R)" signal, the transistor 486 is rendered conductive, so that the emitter circuit of the transistor 418 and the emitter circuit of the transistor 448 may be completed.

Therefore, in the presence of the "compare (R)" signal, the clock pulses $Z_R$ from the tape clock amplifier 100 are amplified by the transistors 464, 470, 474, 412 and 418 and introduced to the input terminal 330 of the magnetic switches 134. Likewise, the converse term $\overline{Z}_R$ is amplified by the transistors 466, 480, 482, 442 and 448 and introduced to the input terminal 332 of the magnetic switches 134. However, in the absence of the "compare (R)" signal, the transistors 476 and 486 are nonconductive to break the circuit between the clock pulses $Z_R$, $\overline{Z}_R$ and the respective input terminals 330, 332 of the magnetic switches 134. The "compare (R)" signal and the block address signals fed to the block address read amplifier 106 are synchronized so that the block address loaded into the block address core register (R) 126 coincides with the address of the key producing the "compare (R)" signal in the compare (R) network 90.

Therefore, by suitable control of the driver circuit 136, and the load circuit 130, a block address read from the magnetic tape is stored in the block address core register (R) 126. This block address is the block address of the contents of the output core buffer 45. Then, the block address, under the control of the "block address unload (R)" signal is read out of the block address core register 126, and the cores in that register are reset to 0. The block address read out of the core register 126 is introduced through the block address sense amplifier (R) 128 to the "or" gate 150. The "block address unload (R)" signal is so timed that the read-out block address has a desired timing with respect to the other signals fed through the "or" gate 150 to the data processor.

As noted above, the block address signals are carried on a separate channel on the magnetic tape in the magnetic storage tape unit 20. These signals are read by a first read head which introduces them to the block address read amplifier (W) 104 of FIGURE 5, and they are read by a second read head which introduces them to the block address read amplifier (R) 106.

The block address signals introduced to the block address read amplifier (W) 104 of FIGURE 5 have an appropriate timing which respect to the corresponding block locations identified by them, so that such signals may be introduced to the current block address register 54, and then compared with the desired block address in the compare network 564, so as to produce the output signal "compare (W)" at the proper time to permit the contents of the input core buffer 22 to be inserted at the proper location on the tape.

In like manner, the block address signals from the magnetic tape unit 20 are introduced to the block address read amplifier (R) 106 of FIGURE 5 have an appropriate timing, as described above, so that a selected block address may be loaded into the block address core register (R) 126 after a successful comparison of the key of its corresponding block of information in the compare network (R) 90.

Similarly, the key signals from the magnetic tape unit 20 are fed to the read amplifiers 121 of FIGURE 5 with an appropriate timing, as described above, so that a selected key may be loaded into the compare key register 122 after the above mentioned successful comparison in the compare network (R) 90.

Appropriate circuitry for the block address read amplifier (R) 106 is illustrated in FIGURE 9. It will be appreciated that similar circuitry may be utilized for the block address read amplifier (W) 104, and for the read amplifiers 41, 42 and 121. The tape clock pulses $Z_r$ from the tape read clock amplifier 100 of FIGURE 5 are introduced to the block address read amplifier 106, whereas the tape clock pulses $Z_w$ from the tape write clock amplifier 102 are introduced to the read amplifier 104.

The read amplifier 106 includes a transistor 500 which may be of the type designated SB100. The emitter of the transistor 500 is grounded, and its collector is connected to a resistor 502. The resistor 502 may have a resistance of 4.7 kilo-ohms, and it is connected to the negative terminal of the 4 volt direct voltage source. The read amplifier 106 has an input terminal 504 which receives the block address signals from the magnetic tape unit 20 of FIGURE 5. This input terminal is connected to a capacitor 506, and the capacitor is connected to a grounded resistor 508 and to the base of the transistor 500. The capacitor 506 may have a capacity of 270 micro-microfarads, and the resistor 508 may have a resistance of 10 kilo-ohms.

The collector of the transistor 500 is connected to the collector of a similar transistor 510 and to a coupling capacitor 512. The coupling capacitor 512 may have a capacity of 2000 micro-microfarads, and the transistor 510 may be of the type designated SB100. The capacitor 512 is connected to a resistor 514 and to the base of a transistor 516. The transistor 516 may be of the type designated SB100, and the resistor 514 may have a resistance of 22 kilo-ohms. The resistor 514 is connected to the negative terminal of the 4 volt direct voltage source. The emitters of the transistors 510 and 516 are grounded, and the collector of the transistor 516 is connected to a resistor 518 and to the base of a transistor 520. The resistor 518 has a resistance of 4.7 kilo-ohms, and it is connected to the negative terminal of the 4 volt direct voltage source.

The transistor 520 may be of the type designated 2N417. The emitter of the transistor is connected to the collector of a like transistor 522. The clock pulses $Z_R$ are introduced to the base of the transistor 522, and the emitter of that transistor is grounded. The collector of the transistor 520 is connected to a resistor 524 and to the base of a transistor 526. The resistor 524 may have a resistance of 5.6 kilo-ohms, and it is connected to the negative terminal of the 14 volt direct voltage source and to a grounded capacitor 528. The capacitor 528 may have a capacity of 10 microfarads. The transistor 526 may be of the type designated GT763. The emitter of the transistor is grounded, and its collector is connected to a resistor 530. The resistor 530 may have a resistance of 300 ohms, and it is connected to the negative terminal of the 14 volt direct voltage source, and to the grounded capacitor 528.

The collector of the transistor 526 is connected to a 10 kilo-ohm resistor 532 and to the base of a transistor 534. The transistor 534 may be of the type designated 2N316. The resistor 532 is connected to the positive terminal of the 2 volt direct voltage source.

The emitter of the transistor 534 is grounded, and the collector of the transistor is connected to a pair of shunt-connected resistors 536 and 538. These resistors each have a resistance of 2.7 ohms and they are connected to a resistor 540. The latter resistor 540 has a resistance of 51 ohms, for example, and it is connected to the input terminal of the block address core register (R) 126. This block register was described in conjunction with FIGURE 6.

The input signals from the tape unit 20 are introduced to the input terminal 504, and these signals are amplified in the circuitry of FIGURE 9. The amplified signals are also timed by the clock pulses $Z_R$ to be introduced with the proper timing to the block address core register 126. The "compare (R)" signal is introduced to the load circuit 130 (FIGURE 5) at the proper time so that the selected block address from the amplifier 106 is stored in the block address core register 126. The "block address unload (R)" signal is then introduced to the unload circuit 132 so that the signals corresponding to the block address stored in the register 126 are read out of the register and into the block address sense amplifier 128 for application through the "or" gate 150 to the data processor. It will be understood that a similar control is exerted on the block address core register 108 by the load circuit 110 and the unload circuit 112; and on the key core register 122 by the load circuit 125 and the unload circuit 127.

A suitable circuit diagram for the block address sense amplifier (R) 128 of FIGURE 5 is shown in FIGURE 10. It will be understood that the block address sense amplifier (W) 114 may incorporate similar circuitry, as may the data sense amplifier 84, the key sense amplifier 120 and the compare key sense amplifier 123. The amplifier 128 in FIGURE 10 receives signals from the output terminal 256 of the block address core register (R) 126 of FIGURE 6. Such signals are introduced to one terminal of the primary winding of a transformer 550, the other terminal of that winding being grounded. The transformer 550 may include a secondary winding of 100 turns, as compared with 35 turns in the primary winding.

One terminal of the secondary of the transformer 550 is connected to the negative terminal of a 0.25 volt direct voltage source. The other terminal of the secondary is connected to a resistor 552 and to the base of a transistor 554. The resistor 552 may have a resistance of 10 kilo-ohms, and the transistor 554 may be of the type designated 2N417. The emitter of the transistor 554 is grounded, and its collector, together with the resistor 552, are connected to the primary of a transformer 556. Both the primary and secondary windings of the transformer 556 may have 90 turns. The other terminal of the primary of the transformer 556 is connected to a resistor 558. This resistor may have a resistance of 100 ohms, and it is connected to the negative terminal of the 4 volt direct voltage source.

The secondary of the transformer 556 is connected across a diode bridge network 560. The other terminals of the diode bridge network are connected to ground and to the juntcion of a pair of resistors 562 and 564 respectively. The resistor 562 may have a resistance of 6.8 kilo-ohms, and the resistor 564 may have a resistance of 62 ohms. The junction of the resistors 562 and 564 is connected to the base of a transistor 566. The resistor 564 is grounded, as is the emitter of the transistor 566. The transistor 566 may be of the type designated 2N417.

The collector of the transistor 566 is connected to a resistor 568 and to the base of a transistor 570. The resistor 568 has a resistance of 2.2 kilo-ohms, and it is connected to the negative terminal of the 4 volt direct voltage source. The transistor 570 has its emitter connected to ground, and the collector of the transistor is connected to a resistor 572 and to an output terminal 574. The resistor 572 has a resistance of 2.2 kilo-ohms, and it is connected to the negative terminal of the 4 volt direct voltage source. The output terminal 574 is connected to the "or" gate 150 in FIGURE 5, and it supplies block address signals through the "or" gate to the data processor.

It should be pointed out again that each time the block address core register 126 is unloaded, signals representing the corresponding block address are fed through the "or" gate 150 to the data processor; and that the block address core register 126 is unloaded at the proper time; so that the block address signals fed to the data processor bear a desired time relation to the compare key register signals from the compare key sense amplifier 123, and the output core buffer data signals from the data sense amplifier 84. The data processor then receives information in serial form including signals corresponding to the desired data and its key information, and also including signals corresponding to the block address on the magnetic tape in the unit 20 from which the data was obtained.

The block address sense amplifier (R) 128 of FIGURE 10, and the other sense amplifiers mentioned above, not only amplifies the signals introduced to it, but also serves to rectify the signals. This rectification in the case of the amplifier 128, is accomplished by the diode bridge 560 and the signals appearing at the output terminal 574 are in the form of pulses, all of like polarity. The result is that each binary "1" is represented by a negative pulse at the output terminal 574 of a potential of the order of 4 volts and each binary "0" is represented by 0 voltage at the output terminal; or vice versa.

The "load" circuit 130 for the block address core register (R) 126 is shown in circuit detail in FIGURE 11. It will be understood that the "load" circuit 110 for the block address core register (W) 108 may incorporate a similar circuit, as may the "load" circuit 125 for the compare key core register 122. It will also be understood that the "load" circuit 130 is keyed by the clock pulses $Z_R$, and the "load" circuit 110 is keyed by the clock pulses $Z_W$. This keying of the "load" circuits is merely to prevent excess heating in the transistor circuitry. The "compare (R)" signal from the compare network 90 of FIGURE 5 is introduced to the base of a transistor 580, and the clock pulses $Z_R$ are introduced to the base of a transistor 582. It should be pointed out that the "compare (R)" signal has an appropriate timing to cause the block address core register (R) 126 to be set to a loading condition just prior to the introduction of the block address signals to it by the read amplifier 106 which correspond to the successfully compared key in the compare network 90.

The transistors 580 and 582 may each be of the type designated SB100. The emitter of the transistor 582 is grounded, and the collector of the transistor is connected to the emitter of the transistor 580. The collector of the transistor 580 is connected to a resistor 584 and to the base of a transistor 586. The transistor 584 may have a resistance of 4.3 kilo-ohms, and it is connected to the negative terminal of the 4 volt direct voltage source.

The transistor 586 may be of the type designated SB100. The emitter of the transistor 586 is grounded, and its collector is connected to a resistor 588 and to the base of a transistor 590. The resistor 588 may have a resistance of 1 kilo-ohm, and it is connected to the negative terminal of the 4 volt direct voltage source. The transistor 590 may be of the type designated 2N417. The emitter of the latter transistor is grounded, and its collector is connected to a resistor 592 and to the base of a transistor 594. The resistor 592 may have a resistance of 5.6 kilo-ohms, and it is connected to the negative terminal of the 14 volt direct voltage source.

The transistor 594 may be of the type designated GT763. The emitter of the transistor 594 is grounded, and its collector is connected to a resistor 596, to the base of a transistor 598 and to a resistor 600. The resistor 596 has a resistance of 300 ohms and it is connected to the negative terminal of the 14 volt direct voltage source. The resistor 600 has a resistance of 10 kilo-ohms, and it is connected to the positive terminal of the 2 volt direct voltage source.

The transistor 598 is connected as an emitter follower. The collector of the transistor 598 is connected to the negative terminal of a 12 volt direct voltage source. The emitter of the transistor is connected to the input terminal 254 of the block address core register (R) 126 of FIGURE 6.

As described in conjunction with the description of the operation of the block address core register (R) 126 in FIGURE 6, the introduction of the "compare (R)" signal to the load circuit 130 effectively establishes the terminal 254 at the −12 volt level. As noted above, this is not continuous, but is pulsed in accordance with the clock pulses $Z_R$. The net result is that in the presence of the "compare (R)" signal, each clock pulse $Z_R$ establishes the terminal 254 at the −12 volt level. This is in coincidence with the reading of information from the block address read amplifier (R) 106 of FIGURE 9, because that amplifier is also keyed by the clock pulses $Z_r$, as mentioned above. Therefore, in the presence of the "compare (R)" signal, the "load" circuit of FIGURE 11 conditions the block address core register 126 to be loaded by the block address signals from the read amplifier 106.

The "unload" circuit 132 for the block address core register (R) 126 is similar in its circuitry to the load circuit 130. The circuitry for the "unload" circuit 132 is illustrated in FIGURE 12. As illustrated in FIGURE 12, the "block address unload (R)" signal is introduced to the base of a transistor 610, and the clock pulses $T_1$ from the data processor are introduced to the base of a transistor 612. The "block address unload (R)" signal is timed, as mentioned above, so that the contents of the block address core register 126 may be fed with a desired time relation to the data processor. The unload circuit 132 establishes the terminal 246 of the block address core register (R) 126 of FIGURE 6 at the −12 volt level in the presence of the "block address unload (R)" signal. Again, this establishment is not continuous, but is pulsed. However, the pulsed establishments of the terminal 246 at the −12 volt level are in accordance with the computer clock pulses, so that the data read into the computer may be synchronized with the computer timing signals.

Figures 13, 14:
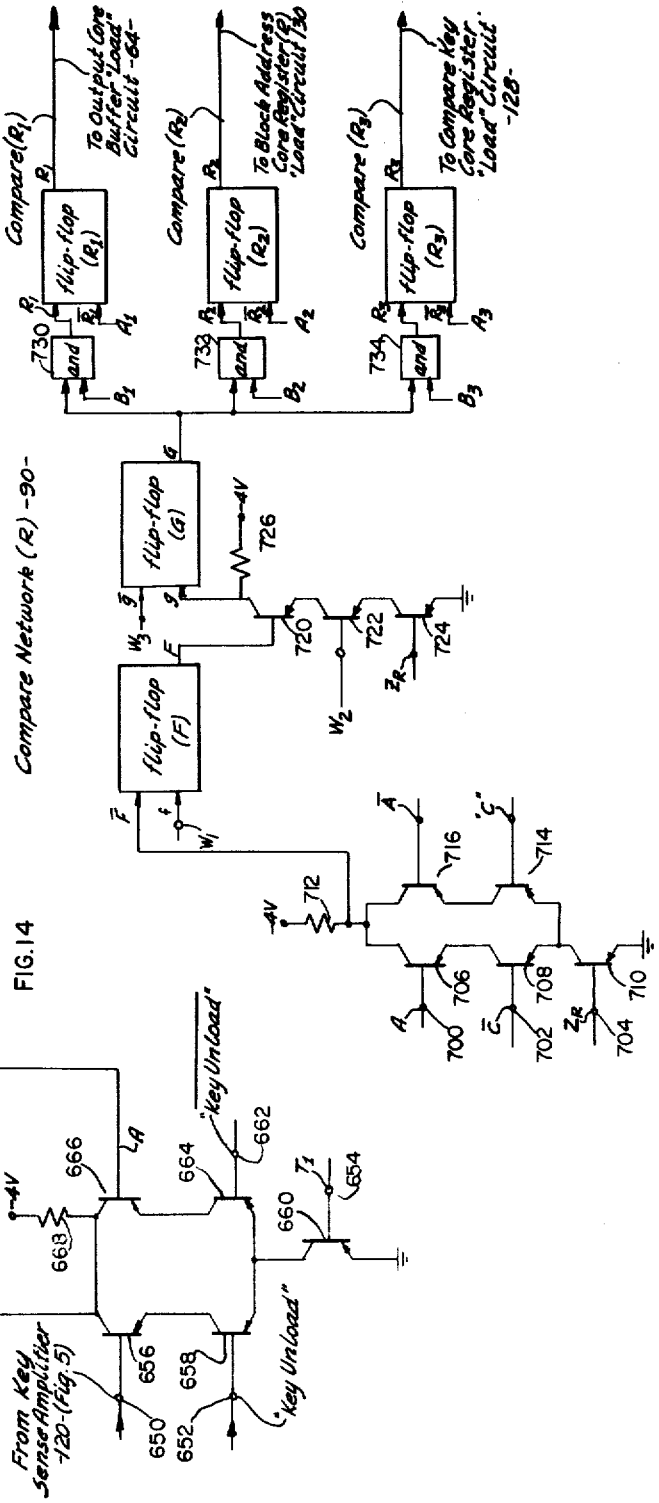
FIGURE 13 is a schematic diagram of a circulating-type register which is used to store key signals in the system of FIGURE 5.
FIGURE 14 represents certain logic circuitry which is used in the system of FIGURE 5 to compare desired keys and addresses with current keys and addresses for purposes to be explained.

The current key register 86, and its associated circuitry, is shown in somewhat more detail in FIGURE 13. As described above, and as will be described in more detail subsequently, the key information portion of each block of data derived from the magnetic storage tape unit through the read amplifiers 42 is inserted into the key core register 44. Subsequently, the key information signals in the key core register 44 are introduced through the key sense amplifier 120 to the current key register 86. The current key register 86, therefore, stores signals corresponding to the key of each successive block of information read through the read amplifiers 42.

The circuitry of the current key register 86, as shown in FIGURE 13, includes an input terminal 650 to which the key information signals from the key sense amplifier 120 are introduced. The assembly also includes an input terminal 652 which receives the "key unload" signal. This latter signal, as explained above, is timed to unload the key core register 44 after each key information signal group has been stored in the register. The assembly also includes a third input terminal 654 which receives the data processor clock pulses $T_1$.

The input terminal 650 is connected to a transistor 656, the input terminal 652 is connected to the base of a transistor 658, and the input terminal 654 is connected to the base of a transistor 660. The assembly of FIGURE 13 also includes an input terminal 662 to which the converse of the "key unload" signal is introduced. This latter input terminal is connected to the base of a transistor 664. The transistors 656, 658, 660 and 664 may all be of the SB100 type.

The emitter of the transistor 660 is grounded, and the collector of the transistor is connected to the emitter of the transistor 658 and to the emitter of the transistor 664. The collector of the transistor 658 is connected to the emitter of the transistor 656, and the collector of the transistor 664 is connected to the emitter of a transistor 666. The latter transistor also may be of the SB100 type. The collector of the transistor 666 is connected to the collector of the transistor 656 and to a resistor 668. The resistor 668 may have a resistance of 2.2 kilo-ohms, and it is connected to the negative terminal of the 4 volt direct voltage source.

The collectors of the transistors 656 and 666 are connected to the base of a transistor 670 and to the input terminal $b$ of a flip-flop (B). The transistor 670 may also be of the SB100 type. The emitter of the transistor 670 is grounded, and its collector is connected to a resistor 672 and to the input terminal $\bar{b}$ of the flip-flop (B). The resistor 672 may have a resistance of 2.2 kilo-ohms, and it is connected to the negative terminal of the 4 volt direct voltage source.

The output terminal B of the flip-flop (B) is connected to a first delay line 674 of any appropriate construction. Likewise, the output terminal $\bar{B}$ of the flip-flop (B) is connected to the input terminal of a second delay line 676. These delay lines are provided with a delay sufficient to accommodate all the characters which make up the key of each information block.

The output terminal of the delay line 674 is connected to the input terminal $a$ of a flip-flop (A), and the output terminal of the delay line 676 is connected to the input terminal $\bar{a}$ of the flip-flop (A). The output terminal A of the flip-flop (A) is connected back to the base of the transistor 666.

Under the control of the column magnetic switch 76 and driver circuit 78 of FIGURE 5, and of the "unload" circuit 70, the contents of the key core register are fed through the key sense amplifier 120 to the input terminal 650 of the current key register 86. In the presence of the "key unload" signal the circuit is completed to the transistor 656, so that each clock pulse $Z_R$ causes the key to be read in serial manner into the flip-flop (B). The key is stored in the key core register 86, and it is circulated in that register upon the termination of the "key unload" signal. Such termination causes the transistor 664 to become conductive, to enable the key information to be circulated.

As mentioned above, the key information in the current key register 86 is read into the compare network (R) 90, and it is compared in that network with the desired keys in the register 120. When a comparison is achieved, the resulting "compare (R)" signal is introduced to the "load" circuit 64, and to the "load" circuits 130 and 125. These "load" circuits then condition the output core buffer 45 to receive the signals corresponding to the block of data associated with the compared key, the block address core register 126 to receive the block address of the block of data, and the compare key core register 122 to receive the key itself.

The compare networks 56 and 90 of FIGURE 5 may be of any known type. Appropriate circuitry for the compare network (R) 90 is shown in FIGURE 14. It will be appreciated that similar circuitry may be used for the compare network (W) 56. The compare network 90, as shown in FIGURE 14, includes an input terminal 700 which receives the current key (A) from the current key register 86 of FIGURE 5. The compare network also includes an input terminal 702 which receives the converse ($\bar{C}$) of the desired key from the desired key register 120 of FIGURE 5. In addition, the compare network 90 includes an input terminal 704 which receives the clock pulses $T_1$ from the data processor.

The input terminals 700, 702 and 704 are connected respectively to the base electrodes of a group of transistors 706, 708 and 710. The emitter of the transistor 710 is grounded, and its collector is connected to the emitter of the transistor 708. The collector of the transistor 708 is connected to the emitter of the transistor 706, and the collector of the transistor 706 is connected to a resistor 712 and to the input terminal $\bar{f}$ of a flip-flop (F). The resistor 712 has a resistance of 2.2 kilo-ohms, and it is connected to the negative terminal of the 4 volt direct voltage source.

The desired key (C) from the desired key register 120 of FIGURE 5 is introduced to the base of a transistor 714, and the converse ($\bar{A}$) of the current key from the current key register 86 of FIGURE 13 is introduced to the base of a transistor 716. The emitter of the transistor 714 is connected to the collector of the transistor 710, and the collector of the transistor 714 is connected to the emitter of the transistor 716. The collector of the transistor 716 is also connected to the input terminal $\bar{f}$ of the flip-flop (F).

A timing signal $W_1$ is introduced to the input terminal $f$ of the flip-flop (F). This timing signal is synchronized with the information in the current key register 86 and desired key register 120, and it occurs just before the beginning of each word in those registers. The output terminal F of the flip-flop (F) is connected to the base of a transistor 720. The emitter of the transistor 720 is connected to the collector of a transistor 722, and the emitter of the latter transistor is connected to the collector of a transistor 724. The emitter of the transistor 724 is grounded. The transistors 720, 722 and 724 may be similar to the transistors described above. The clock pulses $Z_R$ are introduced to the base of the transistor 724, and a timing signal $W_2$ is introduced to the base of the transistor 722. The timing signal $W_2$ is synchronized with the information in the current key register 86 and desired key register 120, and this timing signal occurs just before the end of each word in those registers.

The collector of the transistor 720 is connected to the input terminal $g$ of a flip-flop (G). The collector is also connected to a resistor 726 which may have the same resistance as the resistor 712 and which is connected to the negative terminal of the four volt direct voltage source.

A timing signal $W_3$ is introduced to the input terminal $\bar{g}$ of the flip-flop (G). The timing signal $W_3$ is synchronized with the magnetic storage tape unit 20, and it is timed to occur after the beginning of the data portion of each block of information read into the read amplifiers 42 of FIGURE 5, after each block address is read into the read amplifier 106 of FIGURE 5, and after the beginning of each key read into the read amplifiers 121 of FIGURE 5. The timing signal $W_3$, as indicated, is chosen to occur at a suitable time which answers all the above criteria.

The output terminal G of the flip-flop (G) is connected to each of a group of "and" gates 730, 732 and 734. A timing signal $B_1$ is introduced to the "and" gate 730, a timing signal $B_2$ is introduced to the "and" gate 732, and a timing signal $B_3$ is introduced to the "and" gate 734. The timing signal $B_1$ is synchronized with the magnetic storage tape unit 20, and it is caused to occur just before the data portion of each block of information read into the read amplifiers 42 of FIGURE 5. The timing signal $B_2$ is also synchronized with the magnetic storage tape unit 20, and it is caused to occur just before each block address read into the block address read amplifier 106. The timing signal $B_3$ is also synchronized with the magnetic storage tape unit 20, and it is caused to occur just before each key read into the read amplifiers 121.

The "and" gate 730 is connected to the input terminal $r_1$ of a flip-flop ($R_1$). In like manner, the "and" gate 732 is connected to the input terminal $r_2$ of a flip-flop ($R_2$), and the "and" gate 734 is connected to the input terminal $r_3$ of a flip-flop ($R_3$). A timing signal $A_1$ is introduced to the input terminal $\bar{r}$ of the flip-flop ($R_1$), a timing signal $A_2$ is introduced to the input terminal $\bar{r}_2$ of the flip-flop ($R_2$), and a timing signal $A_3$ is introduced to the input terminal $\bar{r}_3$ of the flip-flop ($R_3$). The timing signal $A_1$ is synchronized with the magnetic storage tape unit 20, and it is caused to occur at the end of each block of information read into the read amplifiers 42. The timing signal $A_2$ is also synchronized with the magnetic storage tape unit 20, and it is caused to occur after each block address is read into the block address read amplifier 106. The timing signal $A_3$ is likewise synchronized with the magnetic storage tape unit 20, and it is caused to occur just after each key is read into the read amplifiers 121.

A signal "compare ($R_1$)" is developed at the output terminal $R_1$ of the flip-flop ($R_1$). This is the "compare (R)" signal which is introduced to the output core buffer (load) circuit 64. A "compare $(R_2)$" signal is developed at the output terminal $R_2$ of the flip-flop $(R_2)$. This latter signal is the "compare $(R)$" signal which is introduced to the block address core register $(R)$ "load" circuit 130. Finally, a "compare $(R_3)$" signal is produced at the output terminal $R_3$ of the flip-flop $(R_3)$. This latter signal is the "compare $(R)$" signal which is introduced to the compare key core register "load" circuit 125.

The circuit of the transistors 706, 708, 710, 714 and 716 functions as a usual compare network. The flip-flop (F) is triggered on by the timing signal $W_1$ at the beginning of each word in the current key register 86 and in the desired key register 120. When the word in the current key register 86 is different from a corresponding word in the desired key register 120, the transistor network mentioned above becomes conductive before the end of the word time to trigger the flip-flop (F) false. However, when a comparison is achieved between a word in the current key register 86 and a word in the desired key register 120, the transistor network remains nonconductive for the entire word time, so that the flip-flop (F) is still true at the end of the word time and when the timing signal $W_2$ occurs.

The occurrence of the $W_2$ timing signal, in the presence of a successful compare, triggers the flip-flop (G) true. This conditions the "and" gates 730, 732 and 734 for conduction. The flip-flop (G) remains true until after the occurrence of each of the timing signals $B_1$, $B_2$ and $B_3$, and it then is returned false by the timing signal $W_3$ in readiness for the next successful compare.

When the "and" gate 730 is conditioned for conduction by the flip-flop (G), the timing signal $B_1$ triggers the flip-flop $(R_1)$ true at the desired time to enable the output core buffer 45 to receive the data portion of the block of information whose key was successfully compared. The flip-flop $(R_1)$ remains true for a time sufficient to permit the entire data portion of the block to be loaded into the output core buffer 45. Then, the timing signal $A_1$ triggers the flip-flop $(R_1)$ false.

Likewise, when the flip-flop (G) conditions the "and" gate 732 for conduction, the timing signal $B_2$ triggers the flip-flop $(R_2)$ true at the proper time to permit the block address of the successfully compared block of information to be loaded into the block address core register 126. The timing signal $A_2$ then triggers the flip-flop $(R_2)$ false at the end of the loading of the desired block address into the register 126.

Finally, when the flip-flop (G) conditions the "and" gate 734 for conduction, the timing signal $B_3$ triggers the flip-flop $(R_3)$ true at the proper time to permit the key which was successfully compared in the manner described above to be read into the compare key core register 122. The timing signal $A_3$ then triggers the flip-flop $(R_3)$ false at the end of the key loaded into the register 122.

Figure 15:
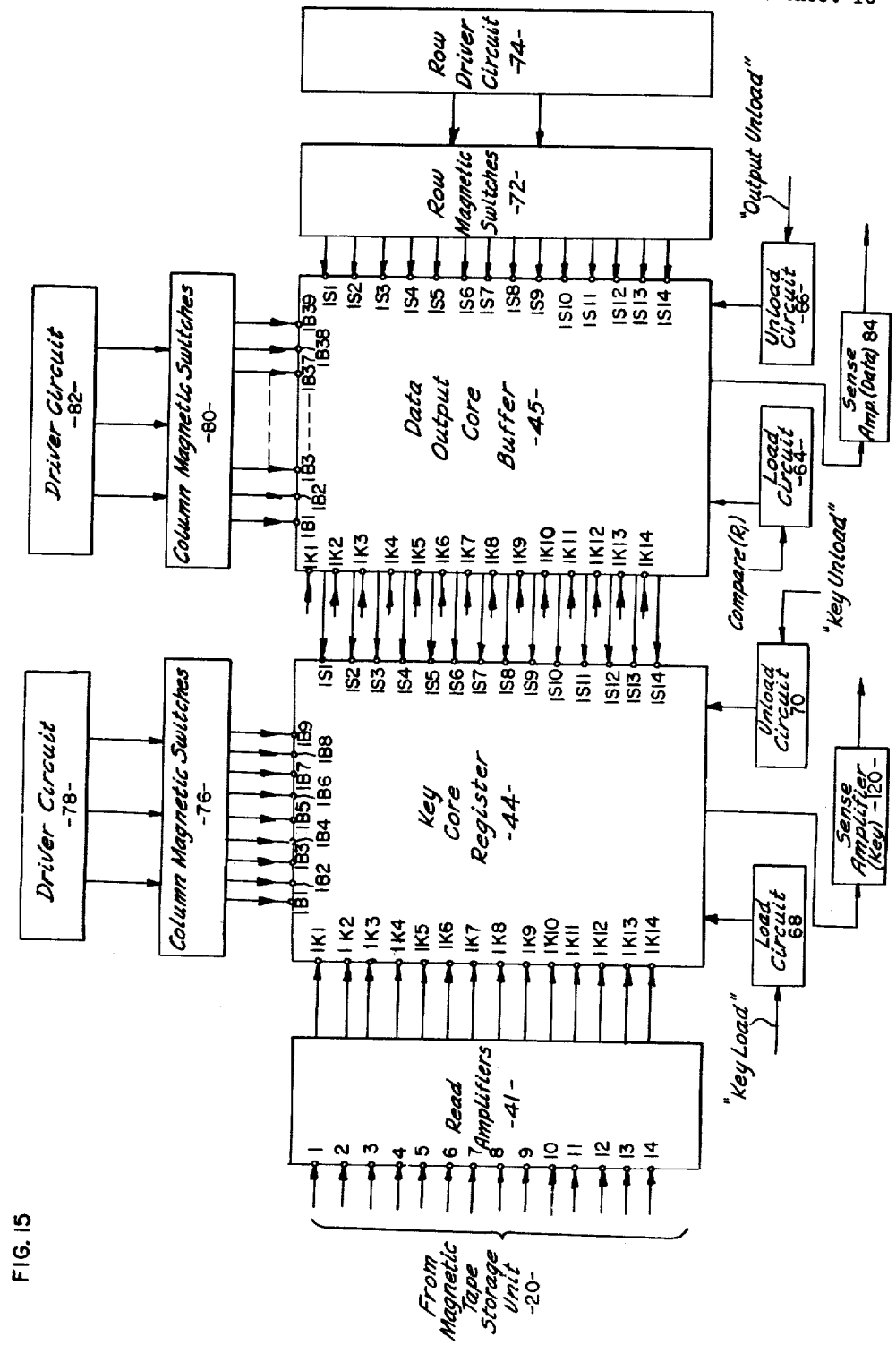
FIGURE 15 is a more detailed block diagram of certain buffers and registers incorporated into the system of FIGURE 5 and of associated components which serve to control the operation of the buffers and registers.

The key core register 44, the data output core buffer 45, and the components associated with these elements, are shown in somewhat more detail in the block representation of FIGURE 15. As illustrated in FIGURE 15, the read amplifiers 42 are provided, for example, with fourteen input terminals which are numbered 1–14. As described above, these input terminals are connected to different ones of the elements in a pair of multi-element electro-magnetic read heads which are magnetically coupled to the magnetic tape 10 (FIGURES 2 and 3) in the magnetic storage unit 20 of FIGURE 5. As the multi-element magnetic head scans or senses the magnetic tape 10, the information on the tape is read in parallel-serial form into the read amplifiers 42. That is, the pair of multi-element read heads supply a pair of characters to the read amplifiers 42 as they scan each successive position of the magnetic tape.

The output terminals of the read amplifiers 41 are connected to a plurality of input terminals 1K1, 1K2, 1K3 ... 1K14, respectively, of the key core register 44. The key core register 44 has a corresponding group of input terminals 1S1, 1S2, 1S3 ... 1S14 which are connected to corresponding output terminals of the data output core buffer 45. Furthermore, the read amplifiers 42 have a group of output terminals which are connected to corresponding input terminals 1K1, 1K2, 1K3 ... 1K14 of the data output core buffer 45.

The data output core buffer 45 has a further group of input terminals 1S1, 1S2, 1S3 ... 1S14 which are connected to the row magnetic switches 72 of FIGURE 5. The row magnetic switches 72 are, in turn, connected to the driver circuit 74 of FIGURE 5. The row magnetic switches 72 may be similar to the magnetic switches 134 for the block address core register (R) 126 described in conjunction with FIGURE 7. Likewise, the driver circuit 74 may be similar to the driver circuit 136 for the block address core register (R) 126 described in FIGURE 8.

The driver circuit 74 controls the row magnetic switches 72 during the unloading of the core buffer 45 and of the core register 44. During the unloading mode current is caused to flow successively into the terminals 1S1, 1S2, ... 1S14 of the data output core buffer 45, and into the corresponding terminals 1S1, 1S2, 1S3 ... 1S14 of the key core register 44. That is, the row magnetic switches 72 are instrumental in causing each of the fourteen rows of the key core register 44 and of the data output core buffer 45 to be successively activated.

As illustrated in FIGURE 15, the column magnetic switches 76 are connected to respective ones of a group of input terminals 1B1, 1B2, 1B3 ... 1B9 of the key core register 44. The column magnetic switches 76 for the key core register 44 are illustrated as being driven by the driver circuit 78 of FIGURE 5. The column magnetic switches 76 may also be similar to the magnetic switches 134 for the block address core register (R) 126 described above in conjunction with FIGURE 7; and the driver circuit 78 may be similar to the driver circuit 136 for the block address core register (R) 126 described in conjunction with FIGURE 8.

As also shown in FIGURE 15, the load circuit 68 is connected to the key core register 44, and that circuit responds to the "key load" control signal for conditioning the key core register 44 for loading. Likewise, the unload circuit 70 is shown as connected to the key core register 44 in FIGURE 15, and the latter circuit responds to the "key unload" signal to condition the key core register 44 for unloading. When the key core register 44 is unloaded, its contents are introduced serially into the sense amplifier 120 of FIGURE 5, and then to the current key register 86. As also mentioned, the "key unload" signal is synchronized with the data processor so that the contents of the key core register 44 may be fed into the current key register 86 in synchronism with the contents of the desired key register 120.

In the manner described, the driver circuit 78 and the column magnetic switches 76 control the nine columns of the key core register 44 so that the columns may be successively activated. Each column is activated in the key core register 44, to permit a corresponding pair of characters to be loaded into the key core register 44 from the read amplifiers 42. The loading of the key core register 44, therefore, proceeds on a column-by-column basis until the register is entirely loaded. The unloading of the key core register 44, however, proceeds on a core-by-core basis so that its contents are serially read through the sense amplifier 120.

The column magnetic switch 80 controls the successive columns of the data output core buffer 45. As illustrated, the column magnetic switch 80 is connected to column input terminals 1B1, 1B2, 1B3 ... 1B38, 1B39. The column magnetic switches 80 may be similar to the magnetic switches described in FIGURE 7, and its associated driver circuit 82 may be similar to the driver circuit of FIGURE 8.

Upon the production of the "compare ($R_1$)" signal by the circuitry of FIGURE 14, the load circuit 64 activates the data output core buffer 45. This activation is timed to permit the desired block of data to be loaded into the data output core buffer on a column-by-column basis. When the data is to be read out of the output core buffer 45, the unload circuit 66 responds to the "output unload" signal from the data processor to activate the data output core buffer 45. This causes the data output core buffer to be read out in a core by core basis, so that its contents may be introduced serially through the sense amplifier 84.

Figure 16:
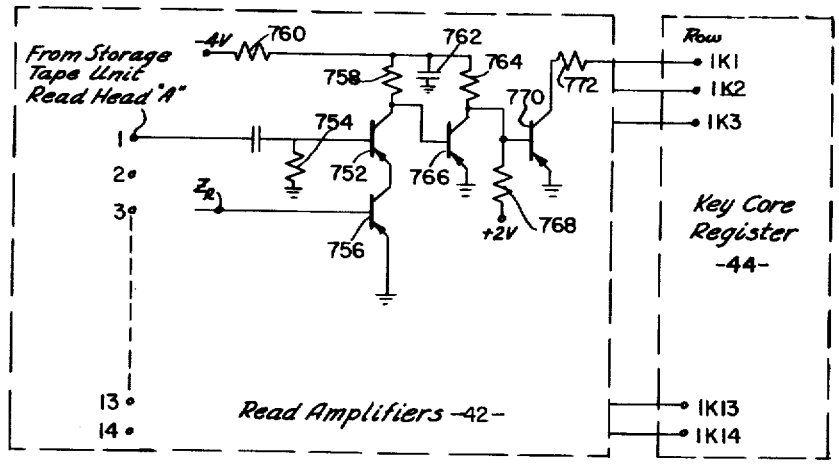
FIGURE 16 is a fragmentary circuit and block diagram to illustrate the manner in which data and key signals are introduced into a register in the system of FIGURE 5.

Typical circuit connections for one of the read amplifiers in the block 42 of FIGURE 5 and FIGURE 15 is illustrated in FIGURE 16. The input terminal 1 of the block 42 in FIGURE 15, for example, is connected to a capacitor 750. This capacitor has a capacitance of 3000 micro-microfarads, and it is connected to the base of a PNP transistor 752 and to a grounded resistor 754 of 100 kilo-ohms. The transistor 752 may be of the type designated 2N417, and its emitter is connected to the collector of a similar PNP transistor 756. The emitter of the latter transistor is grounded. The clock pulses $Z_R$ from the amplifier 100 of FIGURE 5 are introduced to the base of the transistor 756. These clock pulses serve to time the information read through the read amplifiers into the key core register 44 and into data output core buffer 45.

The collector of the transistor 752 is connected to a resistor 758 of 5.6 kilo-ohms. This resistor is connected to a 20 ohm resistor 760, to a grounded 20 microfarad capacitor 762 and to a 300 ohm resistor 764. The resistor 760 is connected to the negative terminal of the 4 volt direct voltage source. The collector of the transistor 752 is connected to the base of a transistor 766. The latter transistor may be of the type presently designated GT763. The emitter of the transistor 766 is grounded, and its collector is connected to the resistor 764, to a 10 kilo-ohm resistor 768, and to the base of a transistor 770. The resistor 768 is connected to the positive terminal of a 2 volt direct voltage source.

The transistor 770 may be of the type presently designated 2N316. The emitter of that transistor is grounded, and its collector is connected to a 52 ohm resistor 772. The resistor 772 is connected to the input terminal 1K1 of the key core register 44. Similar circuitry is interposed between the input terminal 2 of the read amplifier 42 and the input terminal 1K2 of the key core register 44, and between corresponding input terminals of the read amplifiers and the key core register.

In response to each binary 1 introduced to the input terminal 1, for example, of the read amplifiers 42, the transistor 752 is rendered conductive, in the presence of a clock pulse introduced to the transistor 756. This causes the transistor 766 to be rendered nonconductive, and a high current flows through the transistor 770 when the key core register 44 is conditioned for loading. This introduces a high current to the input terminal 1K1 of the key core register during the loading mode. At the same time, each binary 1 introduces a corresponding high current at the input terminals 1K1, 1K2, 1K3 . . . 1K13 and 1K14. Therefore, during the loading mode, each pair of characters introduced to the read amplifiers 42 simultaneously causes current to be introduced to the input terminals 1K1–1K14 respectively for each binary 1 introduced to the read amplifiers.

The key core register 44 is shown in somewhat more detail in FIGURE 17. As mentioned above, this register may be a usual core type of register which utilizes toroidal cores. Several of such cores are indicated schematically by the diagonal lines 800. As mentioned above, these cores are arranged in rows and columns. In the key core register, for example, there are nine columns of cores, and fourteen rows. The input terminal 1K1 of the key core register 44 is connected to a winding 802 which extends through the uppermost row of cores, and is connected at its remote end to an output terminal OK1. In like manner, the input terminal 1K2 is connected to a winding 804 which extends through the second row of cores, and connects with an output terminal OK2. Likewise, the input terminal 1K3 is connected to a winding 806 which extends through a row of cores, and is connected to output terminal OK3. In like manner, the input terminals 1K4 . . . 1K13 are connected to windings which extend through corresponding rows of the cores to connect with similar output terminals OK4 . . . OK13.

As illustrated, the input terminal 1K14 is connected to a winding 808 which extends through the cores to an output terminal OK14. The terminal OK14. The terminals OK1, OK2, OK3 . . . OK14 are connected to the anodes of a plurality of diodes 810, 812, 814 . . . 816. The cathodes of these diodes are all connected to a common lead 820 which is designated the "row load" lead, and which is connected to an input terminal 822.

During the loading of the key core register 44, the terminal 822 is established at a negative potential by the key load circuit 68, as will be described in FIGURE 18. This completes the circuit from the read amplifiers 42 of FIGURE 16 through respective ones of the input terminals 1K1, 1K2, 1K3 . . . 1K14. As also illustrated in FIGURE 17, the input terminal 1B is connected to a winding 824 which extends through the left hand column of cores 800 and terminates in an output terminal OB1. A second winding 826 also extends through the first column of cores from an input terminal 1R1 to an output terminal OR1. The input terminal 1R1 is connected to the input terminal 1B1 as illustrated. As also illustrated in FIGURE 17, the input terminal 1B9 is connected to a winding 828 which extends through the right hand column of cores 800 and terminates in an output terminal OB9. A second winding 830 also extends through the cores 800 between an input terminal 1R9 and an output terminal OR9. The input terminal 1R9 is connected to the input terminal 1B9, as illustrated.

Similar connections extend between the input terminals 1B2, 1B3 . . . 1B7, 1B8, and corresponding output terminals OB1, OB2, OB3, . . . OB7 and OB8. The output terminals OB1, . . . OB9 are connected to the anodes of a group of diodes, such as the diodes 830 and 832. The cathodes of this group of diodes are connected to a common lead 834 which is designated the "column unload" lead. This lead is connected to an input terminal 836. The latter input terminal receives the column unload signal from the "unload" circuit 70 to be described in conjunction with FIGURE 19. This latter circuit, when activated, establishes a negative potential on the common lead 834 to complete the connections through the different columns of cores 800 from the respective input terminals 1B1 . . . 1B9.

The output terminal OR1 is connected to the anode of a diode 840, and the output terminal OR9 is connected to the anode of a diode 842. The other like output terminals are connected to the anodes of similar diodes, and the cathodes of these diodes are connected to a common lead 844. This common lead is designated the "column load" lead, and it is connected to an input terminal 846 which receives the "column load" signal from the key load circuit 68 of FIGURE 18. When the key core register is conditioned for loading, the latter signal establishes the lead 844 at a negative potential to complete the circuit through the windings, such as the windings 826 and 830.

As mentioned above, when it is desired to load the key core register 44, the terminal 822 is established at a negative potential to complete the circuit through the different rows of the register, and the terminal 846 is established at a negative potential to complete the circuit through the different columns of the register. Then, as the column magnetic switches 76 successively introduce currents to the register, these currents flow through the input terminals 1R1 . . . 1R9, and up through the corresponding columns of cores through the windings, such as the windings 826 and 830, and to the common lead 844. The column magnetic switches 76, in this manner, activate the column of cores successively. The current flowing through each column of cores is insufficient, in itself, to turn over a core. However, when a binary 1 is simultaneously introduced to an input terminal, such as the input terminals 1K1 . . . 1K14, the combined currents are sufficient to turn over a corresponding core. In this manner, by the successive activation of the core columns by the magnetic switches, the information from the read amplifiers 42 may be loaded on a column-by-column basis into the key core register 44.

To unload the key core register 44, the row magnetic switches 72 introduce currents sucessively to the input terminal 1S1, 1S2, 1S3, . . . 1S14. These input terminals are connected to windings, such as the windings 850, 852, 853, and 854, which windings link respective ones of the rows of cores 800. The windings 850, 852, 853 and 854 are connected to respective ones of the anodes of a group of diodes 856, 858, 860 and 862. The corresponding windings of the other input terminals 1S4 . . . 1S13 are connected through corresponding output terminals OS4 . . . OS14 to the anodes of further diodes, not shown. The cathodes of all these diodes are connected to a common lead 864 which is designated the "row unload" lead. This lead 864 is connected to an input terminal 866. The latter input terminal receives a "row unload" signal from the key unload circuit 70 of FIGURE 19.

Then, to unload the register 44, the terminal 866 is established at a negative potential, as is the terminal 836. The establishment of the terminal 866 at a negative potential completes a circuit for the switching currents from the row magnetic switches 72 which flow successively through the rows of cores 800 from the input terminals 1S1, 1S2 . . . 1S14. At this time, the common unload lead 834 is established at a negative potential, to complete the circuits for the windings, such as the windings 824 and 828.

Now, the switching currents from the column magnetic switches 76 flow down through these latter windings from the input terminal such as the input terminals 1B1 and 1B9. The switching currents from the column magnetic switches 76 and from the row magnetic switches 72 are so timed that they occur simultaneously in a single core, and this simultaneous occurrence proceeds from core to core. Each current in and of itself is insufficient to turn a core over. However, when a core has previously been turned over by a binary 1, the simultaneous occurrence of the two switching currents will return that core to 0. In this manner, the key core register 44 is reset to have all its cores at 0, and such resetting results in turning over any core which previously was set to 1 in response to a binary 1.

A sense winding (not shown) is linked through all the cores and extends to the key sense amplifier 120 of FIGURE 20. A pulse is produced in this winding in response to each binary 1 previously stored in a core in the key core register 44. In this manner, the information in the key core register is fed in a serial manner through the key sense amplifier 120 of FIGURE 5, and which will be described in more detail in FIGURE 20.

The data output core buffer 45 may be similar in its construction and control to the key core register 44 described above. In the constructed embodiment of the invention, the key core register 44 was provided with nine columns of cores and fourteen rows. In the same constructed embodiment, the data output core buffer 45 was provided with thirty-nine columns of cores and with fourteen rows. It will be remembered, that the load circuit 68 for the key core register 44 (FIGURE 15) is controlled so that each successive key is loaded into the key core register 44 as the recordings on the magnetic tape are successively sensed in the unit 20 of FIGURE 5. The data output core buffer, however, is controlled by the introduction of the "compare ($R_1$)" signal introduced to its load circuit 64 to be loaded only upon the successful compare in the compare network 90 of FIGURE 5, as described above.

Figure 18:
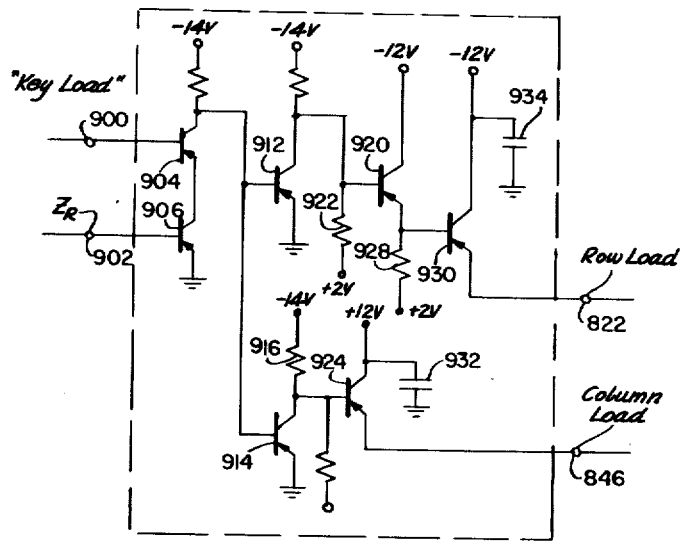
FIGURE 18 is a circuit diagram of a circuit diagram of a circuit for conditioning the key core register to a loading mode.

Specific details of the key load circuit 68 are shown in FIGURE 18. The "key load" signal is introduced to an input terminal 900, and the clock pulses $Z_R$ from the amplifier 100 of FIGURE 5 are introduced to an input terminal 902. The input terminal 900 is connected to the base of a transistor 904, and the input terminal 902 is connected to the base of a transistor 906. Both these transistors may be of the PNP type presently designated 2N417. The emitter of the transistor 906 is grounded, and its collector is connected to the emitter of the transistor 904. The collector of the transistor 904 is connected to resistor 910 of 5.6 kilo-ohms, to the base of a transistor 912, and to the base of a transistor 914. The transistor 910 is connected to the negative terminal of the 14 volt direct voltage source.

The transistors 912 and 914 may also be of the PNP type, as presently designated 2N417. The emitter of the transistor 914 is grounded, and its collector is connected to a 300 ohm resistor 916. The emitter of the transistor 912 is also grounded, and its collector is connected to a 300 ohm resistor 918. The resistors 916 and 918 are both connected to the negative terminal of the 14 volt direct voltage source.

The collector of the transistor 912 is connected to the base of a transistor 920 and to a resistor 922. The resistor 922 has a resistance of 2 kilo-ohms, and it is connected to the positive terminal of the 2 volt direct voltage source. The collector of the transistor 914 is connected to the base of a transistor 924, and to a resistor 926. The resistor 926 has a resistance of 10 kilo-ohms, and it is connected to the positive terminal of the 2 volt direct voltage source. Both the transistors 920 and 924 may be of the type designated 2N316. The emitter of the transistor 920 is connected to a 1 kilo-ohm resistor 928 which, in turn, is connected to the positive terminal of the 2 volt direct voltage source. The collector of the transistor 920 is connected to the negative terminal of the 12 volt direct voltage source. The emitter of the transistor 920 is also connected to the base of a transistor 930 which may be of the PNP type, and which is designated T1335 at present.

The transistors 924 and 930 are connected as emitter followers. The emitter of the transistor 930 is connected to the "row load" input terminal 822 of FIGURE 17, and the emitter of the transistor 924 is connected to the column load input terminal 846 of FIGURE 17. The collector of the transistor 924 and the collector of the transistor 930 are both connected to the negative terminal of the 12 volt direct voltage source. The collector of the transistor 924 is connected to a grounded capacitor 932, and the collector of the transistor 930 is connected to a grounded capacitor 934. Each of these capacitors may have a capacitance of 250 microfarads.

It should be noted that the load circuit 64 (FIGURE 15) associated with the data output core buffer 45 may be similarly constructed. When the "key load" signal is introduced to the input terminal 900, the transistor 900 is conductive in the presence of each clock pulse $Z_R$ introduced to the input terminal 902. As mentioned above, the clock pulses are used so that the load circuit 68 will not be continuously energized. Each time the transistor 904 is conductive, the transistors 912 and 914 are rendered nonconductive. This causes the transistor 920 to be nonconductive; and the emitter follower transistor 930 (whose base is connected to the emitter of the transistor 920) to be conductive. The terminal 822 is therefore rendered negative under such conditions as is desired for this mode of operation. Likewise, when the transistor 914 is nonconductive, the emitter follower transistor 924, whose base is connected to the collector of the transistor 914, is rendered conductive, so that the output terminal 846 is also established negative, which is desired for this mode of operation.

Figure 19:
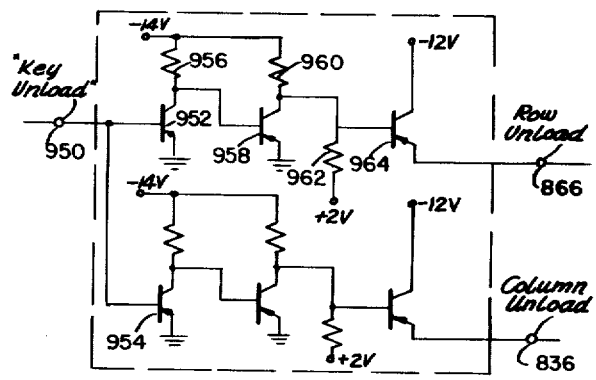
FIGURE 19 is a circuit diagram of a circuit for conditioning the key core register to an unloading mode.

The circuit details of the key unload circuit 70 of FIGURE 15 are shown in FIGURE 19. It should be pointed out that the data unload circuit 66 of FIGURE 15 may be composed of similar circuitry. The key unload circuit 70 has an input terminal 950 to which the "key unload" signal is introduced. The input terminal 950 is connected to the base of a transistor 952 and to the base of a transistor 954. Both these transistors may be of the PNP type, and both may be of the type presently designated 2N417. The transistor 952 is connected through circuitry to be described to an output terminal which is connected to the row unload terminal 866 of FIGURE 17, and the transistor 954 is connected through identical circuitry, which will not be described, to an output terminal which is connected to the "column unload" terminal 836 of FIGURE 17.

The emitter of the transistor 952 is grounded, and its collector is connected to a resistor 956 and to the base of a transistor 958. The resistor 956 may have a resistance of 5.6 kilo-ohms, and its is connected to the negative terminal of the 14 volt direct voltage source. The transistor 958 may be of the type presently designated 2N417. The emitter of that transistor is grounded, and its collector is connected to a 300 ohm resistor 960. The resistor 960 is connected to the negative terminal of the 14 volt direct voltage source.

The collector of the transistor 958 is connected to a resistor 962 and to the base of a transistor 964. The resistor 962 may have a resistance of 10 kilo-ohms, and it is connected to the positive terminal of the 2 volt direct voltage source. The transistor 964 may be of the type presently designated 2N316. The collector of that transistor is connected to the negative terminal of the 12 volt direct voltage source, and the emitter of the transistor 964 is connected to the "row unload" input terminal 866 of the key core register 44 in FIGURE 17.

The occurrence of the "key unload" signal at the input terminal 950 causes the transistors 952 and 954 both to become conductive. The conductivity of the transistor 952 causes the transistor 958 to be nonconductive which, in turn, causes the transistor 964 to establish its emitter at a negative voltage. In this manner, a negative potential is introduced to the input terminal 866 which, for the reasons described above, is desired for the unload mode of the key core register 44. In like manner, a negative potential is established at the input terminal 836 which also is desired, for the reasons described above.

As mentioned above, a sense winding links all the cores of the key core register 44 in FIGURE 17, and a similar sense winding links the cores in the output core buffer 45. These sense windings are connected to appropriate sense amplifiers. The circuit details for the key sense amplifier 120 are shown in FIGURE 20, and similar circuit details may be used for the data sense amplifier 84 (FIGURE 5).

The key sense amplifier 120 in FIGURE 20 includes a pair of input terminals 970. These terminals are connected to the primary of a transformer 972. The turns ratio of the secondary to the primary of the transformer 972 may be of the order of 100:35. One side of the secondary winding is connected to the negative terminal of the .25 volt direct voltage source. The other side of the secondary is connected to the base of a transistor 974 and to a resistor 976. The resistor 976 may have a resistance of 10 kilo-ohms, and it is connected to the collector of the transistor 974. The transistor 974 may be of the type designated 2N417, and the emitter of that transistor is connected to a common lead 978. The lead 978 is connected to one side of the primary winding of the transformer 972.

The collector of the transistor 974 is connected to the primary of a transformer 980. The other side of the primary of the transformer 980 is connected to a resistor 982. This resistor may have a resistance of 100 ohms, and it is connected to the negative terminal of the 4 volt direct voltage source. The transformer 980 may have a turns ratio of 90:90. The secondary winding of the transformer 980 is connected across a diode rectifier bridge 984. The other diagonal of the bridge 984 is connected to the common lead 978 and to the base of a transistor 986. The base of the transistor 986 is also connected to the junction of a resistor 988 and a resistor 990. The resistor 988 has a resistance of 6.8 kilo-ohms, and it is connected to the collector of the transistor 986. The resistor 990, on the other hand, has a resistance of 62 ohms, and it, together with the emitter of the transistor 986, are connected to the common lead 978.

The resistor 986 may be of the type designated 2N417. The collector of that transistor is connected to a resistor 992 and to the base of a transistor 994. The resistor 992 has a resistance of 2.2 kilo-ohms, for example, and it is connected to the negative terminal of the 4 volt direct voltage source.

The transistor 994 is of the type presently designated SB100. The emitter of that transistor is grounded, and its collector is connected to a resistor 996, and to an output terminal 998. The resistor 996 has a resistance of 2.2 kilo-ohms, for example, and it is connected to the negative terminal of the 4 volt direct voltage source. The output terminal 998 is connected to the current key register 86 of FIGURE 5 to supply the key from the key core register 44 to the current key register 86 in the described manner.

It will be remembered that the desired key register 120 is constructed to contain a plurality of keys, and that the system of FIGURE 5 is constructed so that a search may be made for a second block of information, on the basis of a second key comparison, when a first block is being loaded into the output core buffer 45 on the basis of a successful comparison of its key, in the manner described above. In the fragmentary system of FIGURE 21, a pair of output core buffers, designated 45A and 45B are used. The logic associated with the output core buffers 45A and 45B is controlled in such a manner that a block of information is first read into the output core buffer 45A, and the next block derived on the basis of the second successful key comparison, is fed into the output core buffer 45B. This permits a dual searching function to be carried out, and it also provides alternate storage for a second block of information. This eliminates any need for the second located block of information to wait until the first output core buffer is unloaded into the data processor before the second block can be loaded into an output core buffer.

In the system of FIGURE 21, the read amplifiers 41 are connected to an "and" gate 1000 which, in turn, is connected to the input terminals of the output core buffer 45A. It will be appreciated that a plurality of "and" gates 1000 are used, one for each lead extending from the read amplifiers 41 to the input terminals of the output core buffer 45A. In like manner, a plurality of "and" gates, such as the "and" gate 1002 are interposed between the leads from the read amplifiers 41, and the corresponding input terminals of the output core buffer 45B. It will be understood that the output core buffers 45A and 45B may be identical to one another in every respect, and to the output core buffer 45 described above.

A "load" circuit 64A is associated with the output core buffer 45A, and an "unload" circuit 64A is associated with that core buffer. A "load" circuit 64B is associated with the output core buffer 45B, and an "unload" circuit 66B is also associated with the output core buffer 45B. These "load" and "unload" circuits may be similar to the circuits described above.

The output core buffer 45A is unloaded upon the receipt of a "output unload (A)" signal from the data processor, which signal is introduced to the unload circuit 66A. Likewise, the output core buffer 45B is unloaded by a "output unload (B)" signal from the data processor, the latter signal being introduced to the unload circuit 66B. These unload signals from the data processor are supplied alternately, so that the block of information supplied to the data processor is supplied first from the output core buffer 45A, and then from the output core buffer 45B, and so on. Similar duplications to those shown in FIGURE 21 for the output core buffer 45, may be made for the block address core register 126 and for the compare key core register 122 in FIGURE 5.

A signal A′ derived from the data processor is introduced to the input terminal $j$ of a flip-flop (J), and a signal A″ from the data processor is introduced to the input terminal $k$ of a flip-flop (K). An "and" gate 1022 is connected to the input terminal $\bar{j}$ of the flip-flop (J) and an "and" gate 1024 is connected to the input terminal $\bar{k}$ of the flip-flop (K). The output terminal J of the flip-flop (J) is connected to the "and" gate 1000, and the output terminal K of the flip-flop (K) is connected to the "and" gate 1002.

The compare ($R_1$) signal is introduced to an "and" gate 1006 and to an "and" gate 1008. The output terminal H of a flip-flop (H) is also connected to the "and" gate 1008, and the output terminal $\bar{H}$ of the flip-flop (H) is connected to the "and" gate 1006. The "and" gate 1006 is connected to the "load" circuit 64B, and the "and" gate 1008 is connected to the "load" circuit 64A.

An "and" gate 1010 is connected to the input terminal $h$ of the flip-flop (H), and an "and" gate 1012 is connected to the input terminal $\bar{h}$ of that flip-flop. The output terminal $\bar{H}$ of the flip-flop (H) is connected to the "and" gate 1012, and the output terminal H of that flip-flop is connected to the "and" gate 1010. An "and" gate 1014 is also connected to each of the "and" gates 1022, 1024, 1010 and 1012. The signal "compare ($R_1$)" is introduced to the "and" gate 1014, and the timing signal $A_1$ is introduced to the "and" gate 1014. The output terminal $\bar{K}$ of the flip-flop (K) is connected to the "and" gate 1022, and when both the flip-flops (J) and (K) are false, no information can be read into either of the output core buffers 45A or 45B. This is because both the "and" gates 1000 and 1002 are rendered non-conductive. This condition occurs when both the buffers are loaded with data for the data processor. When the data processor unloads the buffer 45A, however, it supplies the signal A′ to the flip-flop (J) to trigger that flip-flop true. This conditions the "and" gate 1000 for conduction. Then the next successful compare produces the "compare ($R_1$)" signal is passed by the "and" gate 1008 to the "load" circuit 64A to condition the output core buffer (A) to its loading mode. This permits the corresponding block of data to be loaded into the output core buffer (A).

The "and" gate 1008 is conditioned for conduction for the operations described in the preceding paragraph by the flip-flop (H). This flip-flop is triggered first to its true state and then to its false state at the end of each compare interval by the timing signal $A_1$. At the termination of the operation described above, the timing signal $A_1$ is passed by the "and" gate 1014 and the "and" gate 1010 to trigger the flip-flop (H) false. This conditions the "and" gate 1006 for conduction. The signal $A_1$ is also passed by the "and" gate 1022 at this time to trigger the flip-flop (J) false. This latter operation prevents any further data from being fed into the output core buffer 45A until it is unloaded by the data processor.

The data processor now unloads the output core buffer 45B. When that is accomplished, it introduces the signal A″ to the input terminal $k$ of the flip-flop (K). This triggers the flip-flop (K) true to permit the next block of data to be fed into the output core buffer 45B. That is accomplished upon the next successful comparison, at which time the resulting "compare ($R_1$)" signal is passed by the "and" gate 1006 to the "load" circuit 64B of the output core buffer 45B. The timing signal $A_1$ at the end of this compare period returns the system to its original condition, and the above described operation may be repeated.

With the inclusion of the dual output buffer assembly of FIGURE 21 in the system of FIGURE 5, the system may perform dual searches and load the resulting data first into the buffer 45A and then into the buffer 45B. When both buffers are loaded, successful comparisons are repeated. However, as the blocks of data in the output core buffers are unloaded into the data processor, the masking register is controlled to prevent further comparisons of those particular blocks. In the manner described, when the output core buffers are unloaded, they are automatically and alternately conditioned to receive the succeeding blocks of data desired by the data processor.

The invention provides, therefore, an improved information storage system in which blocks of data are stored at different block addresses, and each are identified by a key related to its particular block rather than to any particular address. The system of the present invention provides that any block of data may be recovered on the basis of its own key, rather than on the basis of its arbitrarily allocated address.

The invention also provides an improved storage system in which searches may be made simultaneously for a plurality of information blocks. This is achieved in the system of FIGURE 5, for example, by causing each current key in the current address register 86 to be compared with each of the desired keys in the desired key register 120, before the particular current key in the register 86 is replaced by the next key.

The storage system of the invention is also advantageous in that it may incorporate a plurality of output buffers, such as described in conjunction with FIGURE 21. This permits a second desired block to be loaded into a second output buffer in readiness for use by the data processor, before the data processor has unloaded a first buffer. This, in conjunction with the dual searching capabilities, greatly speeds up the time in which successive blocks of data may be located and made available for the data processor.

I claim:

1. An information storage system including: storage means constructed to store a plurality of groups of signals, wherein each group includes signals representing particular data and further includes first signals identifying the particular data and wherein the storage means includes second signals identifying the location of each group of signals in the storage means, first means coupled to the storage means for utilizing the first signals to control the translation of the groups of signals in one direction with respect to the storage means, and second means coupled to the storage means for utilizing the second signals to control the translation of the groups of signals in a second direction with respect to the storage means.

2. An information storage system including: storage means constructed to store a plurality of blocks of signals, wherein each block includes signals representing particular data and further includes key signals identifying the particular data and wherein the storage means includes block address signals identifying the location of each block of signals in the storage means, first means coupled to the storage means for utilizing the block address signals to the exclusion of the key signals to control the introduction of the blocks of signals into the storage means, and second means coupled to the storage means for utilizing the key signals to the exclusion of the block address signals to control the derivation of the blocks of signals from the storage means.

3. An information storage system including: storage means constructed to store a plurality of blocks of signals, wherein each block includes signals representing particular data and further includes a key signal identifying the particular data and wherein the storage means includes block address signals identifying the location of each block of signals in the storage means, means for holding key signals corresponding to the key signals of particular desired ones of the blocks of signals stored in the storage means and for holding block address signals corresponding to the ones of the block address signals included in the storage means which identify the locations of the desired blocks of signals, first compare means coupled to the holding means and to the storage means for comparing the block address signals to the exclusion of the key signals so as to control the introduction of the blocks of signals into the storage means, and second compare means coupled to the holding means and to the storage means for comparing key signals to the exclusion of the block address signals so as to control the derivation of the blocks of signals from the storage means.

4. An information storage system including: a storage means including a plurality of address-designated locations for the storage of signals, input means coupled to the storage means for introducing to respective ones of said locations groups of data signals and respectively associated key signals for identifying the respective groups of data signals, utilization means coupled to the storage means for selectively receiving upon the identification of the respectively associated key signals desired ones of said groups of data signals from the storage means together with address signals respectively identifying the respective locations of such groups in the storage means, and means coupled to the utilization means and to said input means and responsive to respective ones of the address signals for restoring the corresponding groups of data signals in the utilization means to its particular location in the storage means.

5. An information storage system including: storage means including a plurality of address-designated locations for the storage of signals, input means coupled to the storage means for introducing to respective ones of said locations groups of data signals and respectively associated key signals for identifying the respective groups of data signals, utilization means coupled to the storage means for selectively receiving desired ones of said groups of data signals from the storage means upon the selective identification of the key signals respectively associated therewith, means coupled to the storage means for deriving address signals representative of the respective addresses of the locations in the storage means of the groups of data signals selectively received by the utilization means, and means coupled to the utilization means and to said input means and responsive to an address signal from the deriving means for restoring the corresponding group of data signals in the utilization means to its particular location in the storage means.

6. An information storage system, including: storage means constructed to store a plurality of blocks of signals wherein each block includes signals representing particular data and further includes signals representing keys identifying the particular data, the storage means further including signals identifying the location of each block in the plurality, data processing apparatus for processing signals representing particular data in the different blocks in the plurality, means coupled to the storage means for sequentially presenting the different blocks of signals for the processing of such signals, means coupled to the storage means and responsive to the data processing apparatus for searching the different blocks in the plurality for a particular key during the sequential presentation of the blocks in the storage means and for transferring signals to the data processing apparatus from the particular block in the plurality designated by the particular key, and means responsive to the processing by the data processing apparatus of the signals in the block transferred to the data processing apparatus for searching the storage means for the signals identifying the locations of the different blocks in the plurality and for returning the signals in the particular block to its proper location in the storage means in accordance with such search.

7. An information storage system, including, storage means constructed to store at each of a plurality of spaced locations on the storage means signals representing that particular location and constructed to obtain the storage at each location in the plurality of groups of data signals and key signals associated with the data signals to identify the data signals, input means coupled to the storage means for introducing to respective ones of said locations in the plurality groups of data signals and respectively associated key signals for identifying the respective groups of data signals, means responsive to the key signals in the storage means for searching the key signals identifying the different groups of data signals in the storage means to locate the group of data signals identified by a particular key and for obtaining the selection of the signals in the group including the signals representing the location in the storage means of the selected group, utilization means for receiving the data signals selected by the search means for processing such selected signals, and means responsive to the processing of the signals by the utilization means and responsive to the signals representing the location in the storage means of the selected group of signals for obtaining a return of the selected group of signals to the proper location in the storage means.

8. An information storage system including: a storage means including a plurality of address-designated locations for the storage of signals, input means coupled to the storage means for introducing groups of data signals and respectively associated key signals to respective ones of said location, said key signals serving to identify the respective groups of data signals, utilization means coupled to the storage means for selectively receiving desired ones of said groups of data signals from the storage means, first means for receiving signals corresponding to the key signal of a desired one of said groups of data signals, second means coupled to the storage means for successively receiving signals corresponding to the key signals of successive groups of data signals in the storage means, compare means coupled to the first receiving means and to the second receiving means for comparing signals in the first receiving means with the signals in the second receiving means to obtain a compare signal when an equality is achieved, means coupled to the compare means and responsive to said compare signal for introducing the desired one of said groups of data signals to said utilization means together with address signals representative of the address of the location of such group of data signals in said storage means, and means coupled to said utilization means and to said input means and responsive to the address signals from the utilization means for restoring such group of data signals to its particular location in the storage means.

9. An information storage system including: a memory unit, input buffer means for successively receiving groups of data signals together with associated key signals for identifying the respective groups of data signals, control means coupled to the input buffer means and to the memory unit for introducing groups of data signals successively from the input buffer means to designated address locations in the memory unit, first register means for storing signals corresponding to the key signal of a desired group of data signals, second register means coupled to the memory unit for successively storing the key signals of successive ones of the groups of data signals in the memory unit, compare means coupled to the first and second register means for comparing the signals in the first register means with the signals in the second register means to obtain a compare signal when an equality is achieved, utilization means coupled to the memory unit for receiving the desired groups of data signals from the memory unit together with associated address signals respectively identifying the respective address locations in the memory unit of such groups, means coupled to the compare means and to the utilization means for causing the utilization means to receive a particular group of data signals and the address signal associated therewith in response to the compare signal, means for coupling the utilization means to the input buffer means for subsequently introducing the particular group of data signals from the utilization means to the input buffer means, and means coupled to the utilization means and to said control means for restoring the particular group of data signals from the input buffer means to its particular location in the memory unit in response to the address signal associated with that particular group.

10. The combination defined in claim 9 in which the first register means is capable of storing a plurality of key signals respectively corresponding to the key signals of a corresponding plurality of desired groups of data signals in the memory unit to permit the signals in the second register means to be compared in the compare means with each of a plurality of key signals in the first register means.

11. An information storage system including: a memory unit including a plurality of different address locations, input means for successively receiving groups of data signals and associated key signals for identifying the respective groups of data signals, means coupled to the input means and to the memory unit and responsive to different address signals for introducing groups of data signals successively from the input means to corresponding different address locations in the memory unit, and means coupled to the memory unit and responsive to a particular key signal for selecting the patricular group of data signals from the memory unit having a key signal corresponding to the particular key signal.

12. An information storage system including: a memory unit including a plurality of different address locations, input means for successively receiving groups of data signals and associated key signals for identifying the respective groups of data signals, means coupled to the input means and to the memory unit and responsive to different address signals for introducing groups of data signals successively from the input buffer means to corresponding different address locations in the memory unit, first output means coupled to the memory unit for successively receiving desired groups of data signals from the memory unit, and means coupled to the output means and responsive to a particular key signal for causing a particular group of data signals having a key signal corresponding to the particular key signal to be selected from the memory unit and introduced to the output means.

13. An information storage system including: a memory unit including a plurality of different address locations therein, input means coupled to the memory unit for introducing groups of data signals to respective ones of said different address locations in the memory unit together with respectively associated key signals for identifying the different groups of data signals, output means coupled to the memory unit for successively receiving desired groups of data signals from the memory unit, means coupled to the output means and responsive to a particular key signal for causing a particular group of data signals having a key signal corresponding to the particular key signal to be selected from the memory unit and introduced to the output means, means coupled to the memory unit for receiving address signals identifying the address location in said memory unit of said particular group of data signals in the output means, and means coupled to the receiving means and to the output means and responsive to said address signals for subsequently returning said particular group of data signals in the output means to said input means and to its particular address location in the memory unit.

References Cited in the file of this patent

UNITED STATES PATENTS

| | | |
|---|---|---|
| 2,900,132 | Burns et al. | Aug. 18, 1959 |
| 2,923,921 | Shapin | Feb. 2, 1960 |
| 2,930,028 | Johnson et al. | Mar. 22, 1960 |
| 2,933,678 | Westlake | Apr. 19, 1960 |
| 3,015,441 | Rent et al. | Jan. 2, 1962 |
| 3,030,609 | Albrecht | Apr. 17, 1962 |
| 3,045,213 | Zschekel | Aug. 17, 1962 |
| 3,061,192 | Terzian | Oct. 30, 1962 |
| 3,107,343 | Poole | Oct. 15, 1963 |

OTHER REFERENCES

International Business Machines IBM Customer Engineering Manual of Instruction, "650 Data Processing System" (copyright 1956 and 1957) (pp. III–1 to III–7).

Grabbee, Ramo, Woolridge (Ed.) Handbook of Automation, Computation and Control, vol. 2 "Computers and Data Processing" (Wiley and Sons), copyright October 12, 1959, (pp. 2–193 through 2–195).